United States Patent
Grcanac et al.

(10) Patent No.: US 7,552,357 B2
(45) Date of Patent: Jun. 23, 2009

(54) LOST WRITES DETECTION IN A REDUNDANCY GROUP BASED ON RAID WITH MULTIPLE PARITY

(75) Inventors: Tomislav Grcanac, San Jose, CA (US); Sunitha S. Sankar, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 649 days.

(21) Appl. No.: 11/117,852

(22) Filed: Apr. 29, 2005

(65) Prior Publication Data
US 2006/0248378 A1    Nov. 2, 2006

(51) Int. Cl.
*G06F 11/00* (2006.01)
(52) U.S. Cl. .......................................................... 714/6
(58) Field of Classification Search .................. None
See application file for complete search history.

(56) References Cited

U.S. PATENT DOCUMENTS

| | | | | |
|---|---|---|---|---|
| 5,477,552 | A * | 12/1995 | Nishiyama | 714/770 |
| 5,632,012 | A * | 5/1997 | Belsan et al. | 714/6 |
| 5,889,934 | A | 3/1999 | Peterson | |
| 5,951,691 | A * | 9/1999 | Ng et al. | 714/5 |
| 6,023,780 | A * | 2/2000 | Iwatani | 714/770 |
| 6,079,029 | A * | 6/2000 | Iwatani et al. | 714/6 |
| 6,237,052 | B1 * | 5/2001 | Stolowitz | 710/61 |
| 6,282,671 | B1 * | 8/2001 | Islam et al. | 714/6 |
| 6,934,878 | B2 * | 8/2005 | Massa et al. | 714/5 |
| 6,952,794 | B2 * | 10/2005 | Lu | 714/7 |
| 6,985,971 | B2 * | 1/2006 | Wang et al. | 710/10 |
| 6,993,701 | B2 * | 1/2006 | Corbett et al. | 714/770 |
| 7,073,115 | B2 * | 7/2006 | English et al. | 714/770 |
| 7,080,278 | B1 | 7/2006 | Kleiman et al. | |
| 7,093,159 | B1 * | 8/2006 | Nanda | 714/6 |
| RE39,421 | E * | 12/2006 | Stolowitz | 710/61 |
| 7,149,935 | B1 * | 12/2006 | Morris et al. | 714/54 |
| 7,203,892 | B2 | 4/2007 | Corbett et al. | |
| 7,210,091 | B2 * | 4/2007 | Stouffer et al. | 714/770 |
| 7,231,564 | B2 * | 6/2007 | Loaiza et al. | 714/723 |
| 7,246,301 | B2 * | 7/2007 | Chawla | 714/764 |
| 7,263,629 | B2 * | 8/2007 | Corbett et al. | 714/6 |
| 7,302,603 | B2 * | 11/2007 | Nielsen et al. | 714/6 |
| 7,310,745 | B2 * | 12/2007 | Schnapp et al. | 714/8 |

(Continued)

OTHER PUBLICATIONS

Chris Lueth, "NetApp Data Protection: Double Parity RAID for Enhanced Data Protection with RAID-DP", Feb. 2004, pp. 1-15, Network Appliance, Inc., Sunnyvale, California.

(Continued)

*Primary Examiner*—Robert Beausoleil
*Assistant Examiner*—Charles Ehne
(74) *Attorney, Agent, or Firm*—Blakley, Sokoloff, Taylor & Zafman LLP

(57) ABSTRACT

A storage server stores data in a redundancy group of mass storage devices according to a data redundancy scheme. The redundancy scheme enables reconstruction of all data stored in the redundancy group if N or fewer mass storage devices in the redundancy group contain erroneous data, where N is at least 2. In response to determining that the redundancy group contains erroneous data, N−1 mass storage devices in the redundancy group can be specifically identified as containing the erroneous data.

14 Claims, 14 Drawing Sheets

U.S. PATENT DOCUMENTS

| | | | |
|---|---|---|---|
| 7,315,976 B2 * | 1/2008 | Holt | 714/769 |
| 7,409,625 B2 | 8/2008 | Corbett et al. | |
| 7,437,652 B2 | 10/2008 | English et al. | |
| 2003/0126523 A1 * | 7/2003 | Corbett et al. | 714/718 |
| 2004/0078642 A1 * | 4/2004 | Nanda | 714/6 |
| 2005/0114727 A1 * | 5/2005 | Corbett et al. | 714/6 |
| 2005/0120262 A1 * | 6/2005 | Dandrea | 714/6 |
| 2006/0136778 A1 * | 6/2006 | Graverand et al. | 714/6 |
| 2006/0143508 A1 * | 6/2006 | Mochizuki et al. | 714/6 |
| 2006/0156059 A1 * | 7/2006 | Kitamura | 714/6 |

OTHER PUBLICATIONS

Corbett, Peter et al., "Row-Diagonal Parity for Double Disk Failure Correction," Proceeding of the Third USENIX Conference on File Storage Technologie, San Francisco, CA, USA, Mar. 31-Apr. 2004, USENIX Association, 15 pages.

* cited by examiner

|  | D0 | D1 | D2 | D3 | RP | DP |
|---|---|---|---|---|---|---|
|  | $D_{0,4}$ | $D_{0,5}$ | $D_{0,6}$ | $D_{0,7}$ | $P_{0,8}$ | $P_4$ |
|  | $D_{1,5}$ | $D_{1,6}$ | $D_{1,7}$ | $D_{1,8}$ | $P_{1,4}$ | $P_5$ |
|  | $D_{2,6}$ | $D_{2,7}$ | $D_{2,8}$ | $D_{2,4}$ | $P_{2,5}$ | $P_6$ |
|  | $D_{3,7}$ | $D_{3,8}$ | $D_{3,4}$ | $D_{3,5}$ | $P_{3,6}$ | $P_7$ |

FIG. 4

LOST WRITES DETECTION IN A REDUNDANCY GROUP BASED ON RAID WITH MULTIPLE PARITY

FIELD OF THE INVENTION

At least one embodiment of the present invention pertains to data storage systems and more particularly, to a technique for detecting lost writes in a redundancy group based on RAID with multiple parity.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system can include at least one storage server, which is a processing system configured to store and retrieve data on behalf of one or more storage client processing systems ("clients"). In the context of NAS, a storage server may be a file server, which is sometimes called a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Filers are made by Network Appliance, Inc. of Sunnyvale, Calif. (NetApp®).

In a SAN context, the storage server provides clients with block-level access to stored data, rather than file-level access. Some storage servers are capable of providing clients with both file-level access and block-level access, such as certain Filers made by NetApp.

In a large scale storage system, it is inevitable that data will become corrupted or stored incorrectly from time to time. Consequently, virtually all modern storage servers implement various techniques for detecting and correcting errors in data. RAID schemes, for example, include built-in techniques to detect and, in some cases, to correct corrupted data. Error detection and correction is often performed by using a combination of checksums and parity. Error correction can also be performed at a lower level, such as at the disk level.

In file servers and other storage systems, occasionally a write operation executed by the server may fail to be committed to the physical storage media, without any error being detected. The write is, therefore, "lost". This type of the fault is typically caused by faulty hardware in a disk drive or in a disk drive adapter dropping the write silently without reporting any error. It is desirable for a storage server to be able to detect and correct such "lost writes" any time data are read.

While modern storage servers employ various error detection and correction techniques, these approaches are inadequate for purposes of detecting this type of error. For example, in at least one well-known class of file server, files sent to the file server for storage are first broken up into 4 KByte blocks, which are then formed into groups that are stored in a "stripe" spread across multiple disks in a RAID array. Just before each block is stored to disk, a checksum is computed for that block, which can be used when that block is subsequently read to determine if there is an error in the block. In one known implementation, the checksum is included in a 64-Byte identity/signature structure that is appended to the end of the block when the block is stored. The identity/signature structure also contains: a volume block number (VBN) which identifies the logical block number where the data are stored (since RAID aggregates multiple physical drives as one logical drive); a disk block number (DBN) which identifies the physical block number within the disk in which the block is stored; and an embedded checksum for the identity/signature structure itself. This error detection technique is sometimes referred to as "block-appended checksum".

Block-appended checksum can detect corruption due to bit flips, partial writes, sector shifts and block shifts. However, it cannot detect corruption due to a lost block write, because all of the information included in the identity/signature structure will appear to be valid even in the case of a lost write.

Parity in single parity schemes such as RAID-3, RAID-4 or RAID-5 can be used to determine whether there is a corrupted block in a stripe due to a lost write. This can be done by comparing the stored and computed values of parity, and if they do not match, the data may be corrupt. However, in the case of single parity schemes, while a single bad block can be reconstructed from the parity and remaining data blocks, there is not enough information to determine which disk contains the corrupted block in the stripe. Consequently, the corrupted data block cannot be recovered using parity.

Mirroring data to two disks (such as with RAID 1, RAID 10, RAID 0-1, etc.) also does not allow correction of lost writes. A mismatch between two copies of data without checksum errors may indicate lost writes, but it is not possible to determine which data are correct.

Another technique, which is referred to herein as "RAID-DP", uses diagonal parity in addition to row parity, and is described in U.S. patent application Publication no. 2003/0126523, which is assigned to the assignee of the present application. RAID-DP allows two bad blocks in a parity group to be reconstructed when their positions are known.

It is desirable to be able to detect and correct an error in any block anytime there is a read of that block. However, checking parity in both RAID-4 and RAID-DP is "expensive" in terms of computing resources, and therefore is normally only done when operating in a "degraded mode", i.e., when an error has been detected, or when scrubbing parity (normally, the parity information is simply updated when a write is done). Hence, using parity to detect a bad block on file system reads is not a practical solution, because it can cause potentially severe performance degradation due to accessing the other disks in the group for parity computation.

Read-after-write is another known mechanism to detect data corruption. In that approach, a data block is read back immediately after writing it and is compared to the data that was written. If the data read back is not the same as the data that was written, then this indicates the write did not make it to the storage block. Read-after-write can reliably detect corrupted block due to lost writes, however, it also has a severe performance impact, because every write operation is followed by a read operation.

SUMMARY OF THE INVENTION

The invention comprises a method which includes storing data in a redundancy group of mass storage devices according to a data redundancy scheme. The data redundancy scheme enables reconstruction of all data stored in X or fewer mass storage devices in the redundancy group which contain erroneous data, where X is at least 2. In response to determining that the redundancy group contains erroneous data, X−1 mass storage devices in the redundancy group can be specifically identified as containing the erroneous data.

The invention further includes a storage server which can perform such a method. Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 is a schematic diagram of a disk array organized in accordance with the RAID-DP technique;

DETAILED DESCRIPTION

Figure 1:
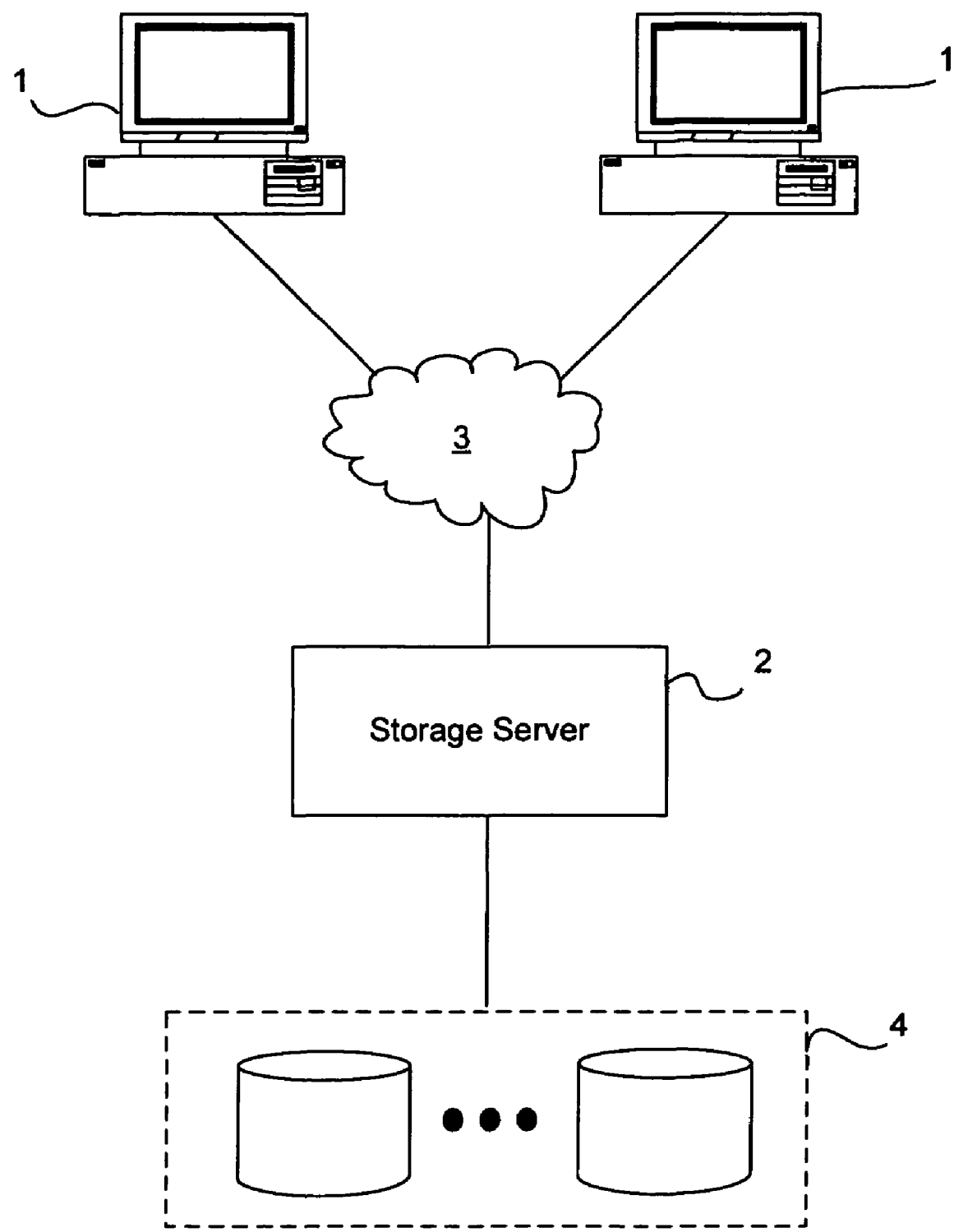
FIG. 1 illustrates a network environment including a storage server.

A method and apparatus for identifying erroneous data, such as due to lost writes, based on the use of RAID with row-diagonal parity, are described. The technique being introduced here can be implemented in a storage server, which stores data in a parity group of disks by using a redundancy scheme that is capable of reconstructing two or more disks in a redundancy group, such as RAID-DP. The term "disk", as used in this description, means any magnetic or optical disk drive unit including one or more rotatable physical storage media (e.g., platters) that can store data in a non-volatile manner. Note, however, that while the following description discusses the use of disks to store data and parity information, the technique being introduced here could easily be adapted for use with a different type of storage device, i.e., other than disks.

Each of the disks in the parity group includes multiple data blocks. The parity group includes one or more data disks to store data, a row parity disk to store row parity information for the stored data, and a diagonal parity disk to store diagonal parity information for the stored data. The row parity information corresponds to parity rows that include data from each of the data disks.

A storage software layer implementing RAID-DP may detect that at least one disk in the parity group contains one or more lost writes (i.e., stale/erroneous data). The lost write(s) may be detected during the process of parity "scrubbing" (a routine process of checking of parity), by comparing stored parity with recalculated parity. In that event, the storage server executes lost write location process, described further below, to specifically identify the specific disk that contains the bad (erroneous) blocks and the specific block(s) on that disk which are bad. The term "block", as used herein in relation to parity computation, may or may not refer to a file block, a database block, a disk sector or any other conveniently sized unit. There is no requirement that the block size used for parity computation have any relation to any other block sizes used in the storage system. However, it is expected that one or more integer number of parity blocks will fit into a unit defined to be one or more integer number of disk sectors. In some embodiments, some number of blocks correspond to file system or database blocks, and will be of size 4 Kbytes or some higher power of two bytes (e.g., 8 Kbytes, 16 Kbytes, 32 Kbytes, 64 Kbytes, etc.).

According to one embodiment of the invention, the lost write detection process includes first selecting a pair of disks in the parity group. Next, all of the data within a stripe which had a parity inconsistency, on the disks in the selected pair, are reconstructed in memory by using the normal RAID-DP reconstruction process. The terms "reconstruction" and "reconstructing", as used herein, refer to the process of recovering a correct set of data by using associated parity or other error correction information. Assuming there is only one disk in the parity group that has the erroneous data (e.g., a lost write), then if one of the disks in the selected pair is the disk that contains erroneous data, then the reconstructed data for that disk in memory will not match the data actually stored on that disk; however, the reconstructed data for the other disk in the pair will match the data actually stored on that other disk.

Therefore, if the reconstructed data match the stored data for one disk of the selected pair but not the other, then the disk for which the data do not match is identified as the disk which contains the erroneous data (e.g., one or more lost writes). On the other hand, if the reconstructed data fail to match the stored data for both disks of the pair, then a different pair of disks in the parity group is selected, and the process is repeated, until the disk with the erroneous data is identified or until all of the disks in the parity group have been tested. If all of the disks in the parity group are tested with no conclusive result, it may indicate that there is more than one disk with erroneous data.

In certain embodiments, as described further below, the parity group has four data disks plus one row parity disk and one diagonal parity disk. However, the lost write detection technique introduced here can be applied to parity groups with a different number of disks. Therefore, stated more generally, the technique being introduced here allows X−1 mass storage devices (e.g., disks) in a redundancy group (e.g., a parity group) to be specifically identified as containing erroneous data, where X≧2, when the technique is built on top of a storage redundancy scheme that can reconstruct all data stored in up to X mass storage devices of the redundancy group (e.g., RAID-DP) that are missing or contain erroneous data.

So for example, when used in conjunction with RAID-DP, which generally allows reconstruction of data on up to two disks that contain erroneous data (but not identification of the erroneous data), the technique introduced here can specifically identify a single disk that contains erroneous data and the particular blocks that are erroneous. Similarly, the technique introduced here, if used with a redundancy scheme that allows full reconstruction of data on up to 3 disks, could be used to specifically identify two disks that contain erroneous data; and so forth.

An advantage of the technique introduced here is that it allows detection and correction of lost writes during parity "scrub" without any overhead for normal read and write operations.

FIG. 1 shows a simple example of a network environment which incorporates a storage server 2, which can be a file server. Note, however, that the technique is not limited to use in traditional file servers. For example, the technique can be adapted for use in other types of storage systems, such as storage servers which provide clients with block-level access to stored data or processing systems other than storage servers.

The storage server 2 in FIG. 1 is coupled locally to a storage subsystem 4 which includes a set of mass storage devices, and to a set of storage clients 1 (hereinafter simply "clients") through a network 3, which may be a local area network (LAN), a wide area network (WAN), a global area network (GAN) such as the Internet, or a combination of such networks. Each of the clients 1 may be, for example, a conventional personal computer (PC), workstation, or the like. The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

The storage server 2 may have a distributed architecture; for example, it may include a separate N- ("network") blade and D- (disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
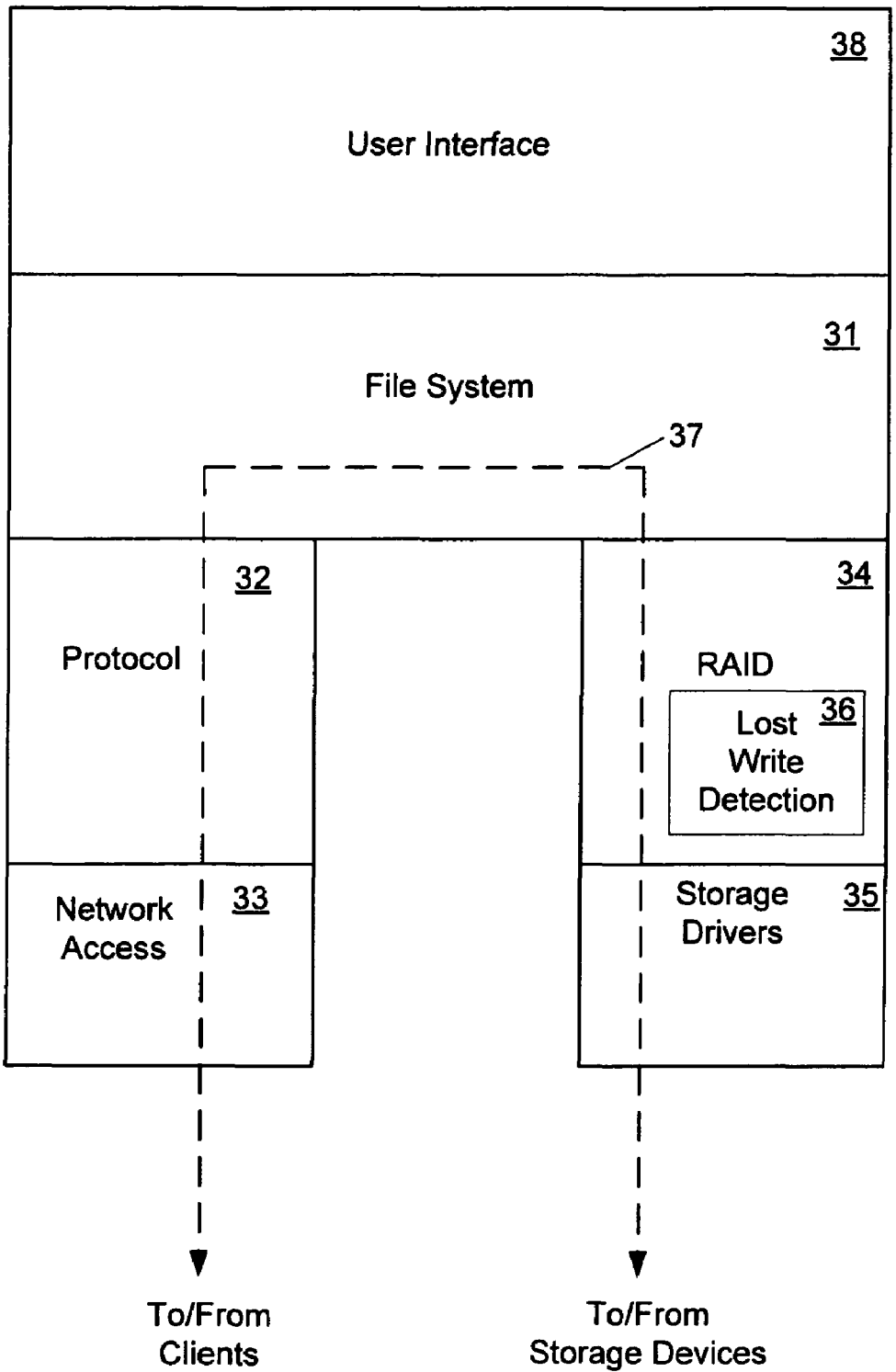
FIG. 2 shows an example of the architecture of the operating system of the storage server.

FIG. 2 shows an example of the operating system 24 of the storage server 2. As shown, the operating system 24 includes several modules, or "layers". These layers include a file system 31. The file system 31 is software that imposes a hierarchy (e.g., a directory/file structure) on the data stored in the storage subsystem 4 and manages read/write operations on the data (i.e., executes read/write operations on the disks in response to client requests). Logically "under" the file system 31, the operating system 24 also includes a protocol layer 32 and an associated network access layer 33, to allow the storage server 2 to communicate over the network 3 (e.g., with clients 1). The protocol 32 layer implements a number of higher-level network protocols, such as Network File System (NFS), Common Internet File System (CIFS), Hypertext Transfer Protocol (HTTP) and/or Transmission Control Protocol/Internet Protocol (TCP/IP). The network access layer 143 includes one or more drivers which implement one or more lower-level protocols to communicate over the network, such as Ethernet or Fibre Channel.

Also logically under the file system 31, the operating system 24 includes a storage access layer 34 and an associated storage driver layer 35, to allow the storage server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-4, RAID-5 or RAID-DP, and therefore it is alternatively called the "RAID layer" 34.

Also shown in FIG. 2 is the path 37 of data flow, through the operating system 24, associated with a read or write operation.

Logically above the file system 31, the operating system 24 also includes a user interface 38 to generate a command line interface (CLI) and/or graphical user interface (GUI), to allow administrative control and configuration of the storage server 2, from a local or remote terminal.

For purposes of this description, it is assumed that the RAID layer 34 implements RAID-DP, as described further below. As shown in FIG. 2, in one embodiment of the invention the RAID layer 34 includes a lost write detection module 36, which implements the lost write detection technique being introduced here, as described above and as further described below.

RAID-DP

Before further describing the lost write detection technique, it is useful to describe a RAID scheme that uses both row parity and diagonal parity. Therefore, an example of such a RAID scheme will now be described and is referred to as "RAID-DP" or "the RAID-DP technique", which is also described in U.S. Patent Application Publication no. 2003/0126523.

The RAID-DP technique is preferably used in an array comprising a number n of storage devices, such as disks, including a row parity disk and a diagonal parity disk, wherein n=p+1 and p is a prime number. The disks are divided into blocks and the blocks are organized into stripes, wherein each stripe comprises n−2 rows. The blocks of the rows selected to form a stripe are typically contiguous on each disk, although this not a requirement of the invention. The diagonal parity disk stores parity information computed along diagonal parity sets ("diagonals") of the array. The blocks in the stripe are organized into n−1 diagonals, each of which contains n−2 blocks from the data and row parity disks, and all but one of which stores its parity in a block on the diagonal parity disk. As a result, the RAID-DP technique provides a uniform stripe depth and an amount of parity information equal to two disks worth, which is the minimum amount required to allow reconstruction from any two disk failures.

The RAID-DP technique involves the computation of row parity across each of the rows of data disks in the array, and thereafter, does not distinguish between the row parity and data blocks when computing the diagonal parity stored on the diagonal parity disk. That is, the diagonal parity is computed along diagonals that collectively span all the data disks and the row parity disk. Moreover, the parity for all of the diagonals except one is stored on the diagonal parity disk. In other words, the diagonal parity disk contains parity blocks for each of the diagonals of a stripe except one. Yet, even though the parity for one of the diagonals is not stored (or computed), the RAID-DP technique provides sufficient parity information to recover from any two concurrent disk failures in the array.

Since the RAID-DP technique may be implemented using a concentrated parity technique, where row parity blocks are all stored on the same disk, data disks may be incrementally added to the array without reformatting or recalculating the existing parity information. The only restriction to the addition of data disks to the array is that the maximum number of disks that can be used in the array must be decided beforehand (a priori). This restriction is due to the use of diagonals and their lengths depending upon the stripe depth. The difference between the number of actual disks present and the maximum number of disks in the array is filled with "imaginary" disks that contain only zero-valued data.

It is also possible to implement the invention using a distributed parity arrangement for the row parity placement. For example, the RAID-DP technique could be implemented by adding a single diagonal parity disk to a RAID-5 array that contains a prime number of disks. The technique will actually work in any arrangement of a prime number of disks that is tolerant of single disk failures by using redundancy, such as parity, within rows. In any such case, the RAID-DP technique is implemented by adding one disk that is dedicated for diagonal parity to the array, and computing diagonal parity using normal parity computations across diagonals defined on the disks of the original array.

The following description of the RAID-DP technique is in terms of a concentrated parity implementation, where all the row parity is stored on a single disk.

With the RAID-DP technique, a parity group comprises n storage devices, where n=p+1 and p is a prime number. The storage devices are divided into blocks, where the blocks are the same size. Within each device, n−2 blocks are arbitrarily selected and grouped to form a stripe across all the devices. Within the stripe, one device is designated to hold parity formed by selecting blocks from the other devices as input. This device is called a diagonal parity device and the parity it holds is called diagonal parity, as a result of the simplified construction technique described further herein. Within each stripe, one block is selected from each of the devices that are not the diagonal parity device in that stripe. This set of blocks is called a row. One block in the row is selected to hold parity for the row, and the remaining blocks hold data. The formulation of rows is continued until all blocks in the stripe that are not in the diagonal parity device are assigned to exactly one row. There are a total of n−2 rows.

Within each stripe, one block is selected from each of all but one of the devices that are not the diagonal parity device in that stripe, with the further restriction that no two of the selected blocks belong to the same row. This is called a diagonal parity set or "diagonal". A diagonal may be formed, for example, by numbering the data, row parity and diagonal parity devices from 0 to n−1, numbering the rows from 0 to n−3, and then assigning the block at device i, row j to diagonal (i+j+1) mod(n−1). The formation of diagonals continues until all blocks that are not on the diagonal parity device in the stripe are assigned to diagonals, where no two diagonals exclude all blocks from the same device. There are n−1 diagonals. Of the n−1 diagonals, n−2 diagonals are selected. The blocks in those diagonals, whether they hold data or parity, are combined to form a diagonal parity block. The n−2 diagonal parity blocks are stored in arbitrary order in the n−2 blocks in the stripe that reside on the device that holds diagonal parity in that stripe.

The RAID-DP technique can be implemented simply by selecting rows that contain blocks that are in the same position in each disk, selecting contiguous groups of n−1 rows to form stripes, and further selecting blocks within the stripe such that a diagonal pattern with wraparound is formed by the blocks in each diagonal. In addition, the invention can be implemented by storing all the row parity blocks in a stripe in the same device in the stripe. In one embodiment, the RAID-DP technique can be implemented by keeping the same use of devices as row parity, diagonal parity or data devices from stripe to stripe. Alternatively, another embodiment of the invention involves rotating or otherwise varying the use of the devices as row parity, diagonal parity or data devices from stripe to stripe.

Parity is generally calculated as an exclusive-OR (XOR) of data blocks to form a parity block. The XOR operation is generally performed over the same 1-bit field in each input block to produce a single corresponding bit of output. The XOR operation is equivalent to two's complement addition or subtraction of two 1-bit fields. Redundant parity information may also be computed as the sum of same-sized multi-bit fields (e.g., 8, 16, 32, 64, 128 bits) in all the inputs. For example, the equivalent of parity may be computed by adding data using two's complement addition on 32-bit fields to produce each 32 bits of redundant information. This is only the case assuming non-reliance on the fact that an XOR operation directed to the same input twice into a block produces the original content of the block, as the XOR of a block with itself produces zero. The inventive technique described herein does not rely on this aspect of XOR and, hence, may be implemented by addition and subtraction over fields wider than one bit.

It should be noted that it is common to store the direct XOR sum of data bits as the parity bit value. This is often referred to as "even parity". An alternative is to store the complement of the XOR sum of the data bits as the parity bit value; this is called "odd parity". The use of even or odd parity with respect to the invention disclosed herein is not specified. However, the algorithms referenced herein are described as if even parity is used, where such a distinction is relevant. Yet it will be apparent to those skilled in the art that odd parity may also be used in accordance with the teachings of the invention.

The illustrative system described herein preferably performs full stripe write operations. In particular, individual file blocks that are typically 4 Kbytes or 8 Kbytes may be divided into smaller blocks used only for parity computation, so that full stripes of, e.g., 4 Kbyte sized blocks can be written to the disks of the array. When full stripes are written to disk, all parity computations may be performed in memory before the results are written to disk, thus reducing the burden of computing and updating parity on disk.

Figure 3:
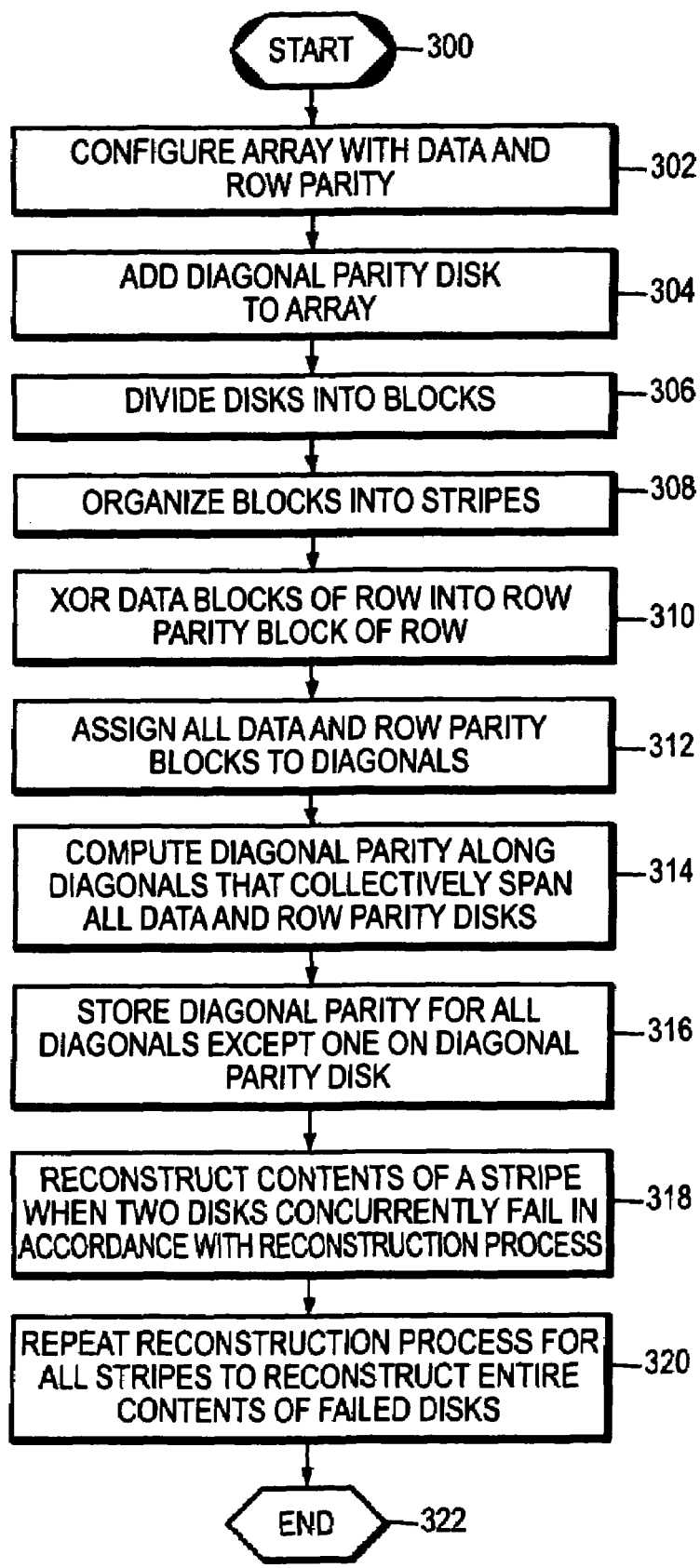
FIG. 3 is a flow diagram illustrating the RAID-DP technique.

FIG. 3 is a flowchart illustrating the RAID-DP technique, according to an embodiment of the present invention. The process starts at 300 and proceeds to 302 wherein the array is configured with a number of storage devices, such as disks, equal to a prime number p, including a row parity disk. At 304, an additional diagonal parity disk is included such that the entire array consists of p+1 disks. As described below, the diagonal parity disk stores diagonal parity that is computed by defining diagonal parity sets that collectively span all the data disks and the row parity disk of the array. The array therefore comprises p−1 data disks, one row parity disk and one diagonal parity disk. At 306, the disks are divided into blocks and, at 308, the blocks are organized into stripes, wherein each stripe comprises n−2 rows of blocks (with n=p+1). Each disk is preferably divided into stripes of n−2 blocks. At 310, each data block of a row is XOR'd into a row parity block of the row containing the XOR of all data blocks at the same position on each data disk.

All of the data blocks and the row parity blocks are then assigned to diagonals at 312. For an array containing p disks, the diagonals are contained within groups of p−1 rows of blocks. There are exactly p diagonals, wherein each diagonal contains one diagonal parity block comprising the XOR of exactly p−1 data and/or row parity blocks. The diagonals wrap around at the edges of the array, with each of the p diagonal sets excluding exactly one disk. Each diagonal must exclude a different disk. Within the set of p−1 rows, every disk block is on exactly one of the p diagonals. Table 1 illustrates an embodiment of an array for p=5 with the diagonals numbered from 0 to 4. The numbers in the table indicate the diagonal parity sets to which each block belongs.

TABLE 1

1 2 3 4 0 1
2 3 4 0 1 2
3 4 0 1 2 3
4 0 1 2 3 4

The positions of the columns can be permuted, as can the positions of the elements in each column, as long as no two blocks in a row belong to the same diagonal parity set, without changing the property that the array can be reconstructed from any two disk failures. Without loss of generality, it can be assumed that blocks are assigned to diagonal parity sets in a way that is substantially in accord with Table 1. Furthermore, membership of blocks in rows can be permuted.

As noted, the parity for the diagonal parity sets is stored on the diagonal parity disk. In accordance with the invention, the RAID-DP technique does not distinguish between the row parity and data blocks when computing the diagonal parity stored on the diagonal parity disk. In other words, all disks of the original array can be treated as equivalent, such that the information stored on any one of them can be recovered from the XOR sum of all the other disks in the row parity set. The diagonal parity disk thus stores diagonal parity computed along diagonal parity sets that collectively span all of the data disks and the row parity disk of the array (314). Note that the roles of the disks, e.g., data, row parity or diagonal parity disks, can be varied from stripe to stripe, allowing RAID-5 style distributed parity implementations.

However, there is insufficient space on the diagonal parity disk to hold all of the parity information for the p diagonals defined on the p−1 rows. In particular, there is only sufficient room for p−1 blocks of diagonal parity. Each data disk and the row parity disk contribute, at most, one block to a diagonal and no row contains two blocks, whether data or row parity, that are both members of the same diagonal. Although there are exactly p diagonals, within a stripe there are only p−1 diagonal parity blocks on the diagonal parity disk.

To overcome this problem, the diagonal parity for one of the diagonal parity sets is not stored on the diagonal parity disk (316). That is, the diagonal parity disk contains parity blocks for each of the diagonals of a stripe except one. The choice of which diagonal parity block not to store is arbitrary. Since that parity is not stored, it is also not computed. Yet even though the parity for one of the diagonals is not stored, the inventive technique provides sufficient parity information to recover from any two concurrent disk failures in the array. That is, the entire contents of a stripe can be reconstructed when any two of its disks are lost in accordance with a reconstruction aspect of the present invention (318). By repeating the reconstruction process for all stripes, the entire contents of the two failed disks may be reconstructed at 320. The sequence then ends at 322.

Since there is no distinction between the row parity disk and the data disks when assigning disks to diagonals, the distinction between the row parity and data disks can be ignored when dealing with recovery from diagonal parity sets. To illustrate, consider that any two data disks or any one data disk and the row parity disk are lost. A lost block of a parity set can be restored only if all other blocks that compose the parity set are available. An artifact of XOR parity is that all blocks are mathematically equivalent, whether they originally hold data or parity. For example, consider the parity construction a^b^c=d, wherein "^" represents an XOR operator. XORing both sides with d gives a^b^C^d=0. Therefore, all the data disks and the row parity disk may be treated the same during reconstruction.

In each of these disks, exactly one diagonal is not represented. Accordingly, reconstruction can begin on the other disk that does not contain a member of that diagonal. Since two disks have failed, in most cases, there are two blocks that can be reconstructed immediately from diagonal parity data. This is true unless one of the diagonals that is missing only one block is the diagonal for which no parity is stored. But since at most one disk is missing data for that parity set, there is at least one block that can be reconstructed immediately. Once one or two blocks are reconstructed from diagonal parity, then the other missing block in that or those row(s) can be reconstructed from row parity, as at that point only one block is missing from the row parity sets having blocks reconstructed using diagonal parity (which does not include the diagonal parity blocks). Once those blocks are reconstructed, one or two more blocks can be reconstructed that are on the same diagonal(s) as the row blocks.

Therefore, reconstruction proceeds by a series of diagonal, then horizontal, "moves". Since p is prime, all series of horizontal then diagonal moves "hit" every row of a stripe before hitting the same row twice. Yet there is one diagonal over which no diagonal move is possible, because parity is not stored for that diagonal. Without losing generality, the diagonals are numbered from 0 to p−1, and parity is computed for all but diagonal 0. Thus, no diagonal moves are possible along diagonal 0. For disks that are a given distance apart in the array, there is always a fixed sequence of diagonals that can be reconstructed ending with diagonal 0. If the disks are numbered from 0 to p−1, and wrap around among the disks is considered so that disk p−1 (the row parity disk) is adjacent to disk 0, then there are (p−1) sequences to consider. Each sequence corresponds to the reconstruction of any pair of disks separated by that distance. Table 2 illustrates sequences for, e.g., p=13:

TABLE 2

| Disks 1 apart: | 1 2 3 4 5 6 7 8 9 10 11 12 0 |
|---|---|
| Disks 2 apart: | 2 4 6 8 10 12 1 3 5 7 9 11 0 |
| Disks 3 apart: | 3 6 9 12 2 5 8 11 1 4 7 10 0 |
| Disks 4 apart: | 4 8 12 3 7 11 2 6 10 1 5 9 0 |
| Disks 5 apart: | 5 10 2 7 12 4 9 1 6 11 3 8 0 |
| Disks 6 apart: | 6 12 5 11 4 10 3 9 2 8 1 7 0 |
| Disks 7 apart: | 7 1 8 2 9 3 10 4 11 5 12 6 0 |
| Disks 8 apart: | 8 3 11 6 1 9 4 12 7 2 10 5 0 |
| Disks 9 apart: | 9 5 1 10 6 2 11 7 3 12 8 4 0 |
| Disks 10 apart: | 0 10 7 4 1 11 8 5 2 12 9 6 3 |
| Disks 11 apart: | 11 9 7 5 3 1 12 10 8 6 4 2 0 |
| Disks 12 apart: | 12 11 10 9 8 7 6 5 4 3 2 1 0 |

Note that the sequence for disks k apart always starts at diagonal k, and continues by incrementing the diagonal by j each time, modulo p, and ends at p, mod p=0. Note also that the first p terms of the sequence for disks k apart is the reverse of the first p terms of the sequence for disks p−k apart.

The starting position on a sequence depends on which pair of disks has failed. When the disks and diagonals are numbered according to the previous description, i.e., the disks are numbered sequentially from 0 to n−1, the rows are numbered sequentially from 0 to n−3 and block i of disk j belongs to diagonal parity set (i+j+1) mod(n−1) in each disk j that has failed, the missing diagonal is always diagonal j. Therefore, for a pair of disks separated by k, the two diagonals for which repair can begin are j and (j+k) mod n−1. Note that these two diagonals are always adjacent in the reconstruction sequence for disks k apart. Reconstruction proceeds in a sequence of diagonals determined by moving to the right from the starting point in the two sequences, for disks k apart starting at symbol (j+k) mod(n−1) and for disks p−k apart, starting at symbol j, where k<p/2. Accordingly, it is always possible to fully reconstruct if any combination of two data disks or one data disk and the row parity disk fails. If the diagonal parity disk and one other disk fail, it is a simple matter to reconstruct the other failed disk, whether it be data or row parity, from the stored row parity and then to reconstruct the diagonal parity disk. As a result, the RAID-DP technique allows recovery from any two disk failures.

Note that not all data blocks belong to a diagonal for which parity is computed. In fact, diagonal parity is computed for only (p−1)/p of the data and row parity blocks. A single block update is expensive, as row parity must be recalculated for that block as well as diagonal parity for the block. Then, when the row parity for the block is updated, the change must be added into the diagonal parity block for the row parity block as well. However, this can be simplified in systems where a stripe is one "block" wide and is composed of sub-blocks used only for parity computation. Here, a parity update is computed that is added to the row parity. Portions of the same parity update block are also added directly to portions of the diagonal parity block for the stripe.

FIG. 4 is a block diagram of a disk array 400 organized in accordance with the RAID-DP technique. Assume n equals the number of disks in the array, where n=p+1. The first n−2 disks (D0-D3) hold data, while disk n−1 (RP) holds row parity for the data disks D0-D3 and disk n (DP) holds diagonal parity. In the illustrated embodiment, the number of disks n in the array equals 6. The disks are divided into blocks and the blocks are grouped into stripes, wherein each stripe equals n−2 (e.g., 4) rows. In addition, there are n−1 (e.g., 5) diagonals per stripe.

The data blocks and the row parity blocks are numbered in FIG. 4 such that each block belongs to a diagonal parity set and, within each row, each block belongs to a different diagonal parity set. The notation $D_{a,b}$ and $P_{a,b}$ denotes the respective contributions of data (D) and parity (P) blocks to specific row (a) and diagonal (b) parity computations. That is, the notation $D_{a,b}$ means that those data blocks belong to the row or diagonal used for purposes of computing row parity a and diagonal parity b, and $P_{a,b}$ stores the parity for row parity set a and also contributes to diagonal parity set b. For example, $P_{0,8}=D_{0,4}\hat{}D_{0,5}\hat{}D_{0,6}\hat{}D_{0,7}$. The notation also includes the row parity block used for purposes of computing the diagonal parity for a particular diagonal, e.g., $P_4=D_{0,4}\hat{}D_{3,4}\hat{}D_{2,4}\hat{}P_{1,4}$. Note that each of the diagonal parity blocks stored on the diagonal parity disk contains contributions from all but one of the other disks (including the row parity disk) of the array. For example, the diagonal parity block $P_4$ has contributions from D0 ($D_{0,4}$), D2 ($D_{3,4}$), D3 ($D_{2,4}$) and RP ($P_{1,4}$), but no contribution from D1. Note also that the diagonal parity for diagonal 8 ($P_8$) is neither computed nor is it stored on the diagonal parity disk DP.

According to the RAID-DP technique, the diagonal parity blocks on disk DP include the row parity blocks in their XOR computation. In other words, the diagonal parity stored on the disk DP is computed not only in accordance with the contents of the data disks but also with the contents of the row parity disk. By encoding the diagonal parity blocks as shown in array 400, the system can recover from any two concurrent disk failures despite the missing diagonal parity ($P_8$). This results from the fact that the row parity blocks are factored into the computations of the diagonal parity blocks stored on the diagonal parity disk DP.

Operationally, if the diagonal parity disk DP and any data disk are lost, recovery is achieved by first rebuilding the data disk from row parity (e.g., in accordance with a conventional RAID-4 reconstruction technique) and then rebuilding the diagonal parity disk. Similarly, if the two parity disks are lost, recovery is achieved by first rebuilding the row parity disk RP from the data disks and then rebuilding the diagonal parity disk DP. On the other hand, losing any pair of data disks allows immediate recovery of one block from at least one and possibly two of the diagonal parity sets. From there, the system is able to recover the rest of the missing data blocks. Notably, losing the row parity disk RP and a data disk is exactly the same as losing two data disks, and recovery may be achieved in the same manner.

Figure 5:
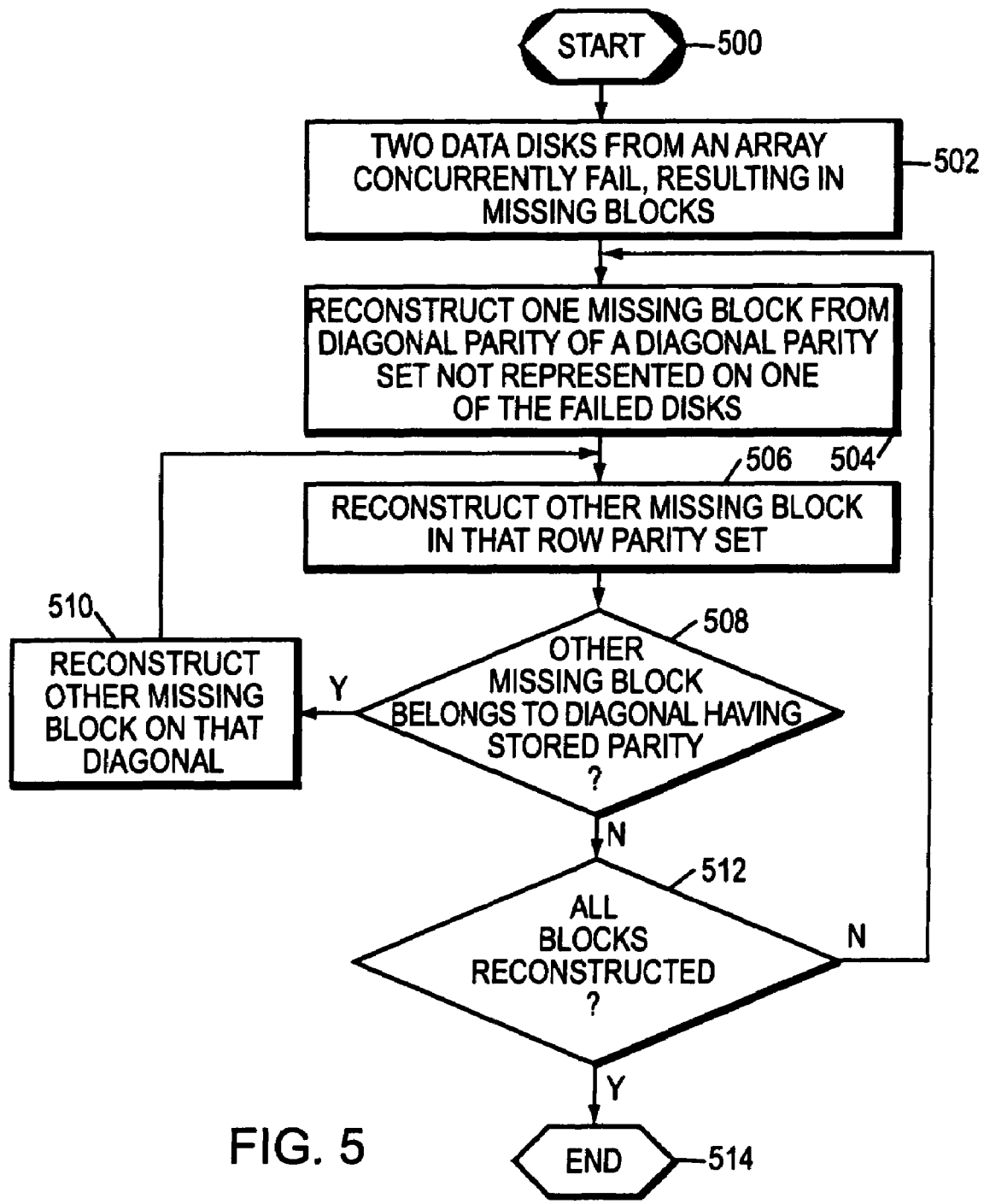
FIG. 5 is a flow diagram illustrating a RAID-DP reconstruction process.

FIG. 5 is a flowchart illustrating an example of the recovery (reconstruction) process aspect of the RAID-DP technique. The sequence starts at 500 and proceeds to 502, where it is assumed that two data disks (or one data disk and the row parity disk) from the array 400 are concurrently lost due to failure. As with any combination of two failed data disks, row parity cannot be immediately used to reconstruct the lost data; only diagonal parity can be used. Given the structure and organization of the array (i.e., the stripe length and stripe depth are not equal) each diagonal does not include (misses) a block from one disk. Therefore, when the two data disks are lost, two diagonals have lost only one member. In other words, two disks are lost and each of those disks is not a member of one diagonal. A diagonal parity block is stored on the DP disk for all but one diagonal; therefore, at 504, reconstruction of at least one, and usually two, of the missing blocks is initiated using diagonal parity.

Once a missing block is reconstructed, reconstruction of a row may be completed by reconstructing the other missing block on that row using row parity (506). When that other block is reconstructed, a determination is made at 508 as to whether the block belongs to a diagonal for which there is stored parity. If the block belongs to a diagonal for which there is parity, the other missing block on that diagonal can be reconstructed from the other disk that is on that diagonal using diagonal parity (510). That is, for all but the missing diagonal, once one block on the diagonal is reconstructed, the other can be reconstructed. The sequence then returns to 506, where the other missing block in that row parity set is reconstructed. However, if the block belongs to a diagonal for which there is no parity (i.e., the missing diagonal), then a determination is made at 512 as to whether all blocks have been reconstructed. If not, the sequence returns to 504 where the pattern of first reconstructing based on diagonal parity, then on row parity, continues until the last data block used in computation of the missing diagonal parity set is reached. Once all blocks have been reconstructed, the sequence ends at 514. The missing diagonal parity set always terminates the chain of reconstruction.

Specifically, assume adjacent data disks D0 and D1 of the array 400 are lost. D0 has no member of diagonal parity set 8 and D1 has no member of diagonal parity set 4. However, the parity for diagonal 8 is neither computed nor stored; therefore, there is only one starting point for reconstruction and that is with diagonal 4. Other conventional double-disk failure parity correcting schemes generally include two starting points for reconstruction; according to an aspect of the present invention, however, only one starting point is needed in those cases where only one is available. Since diagonal 4 is missing only one member, data block $D_{0,4}$ on data disk D0 can be immediately reconstructed from the diagonal 4, which then enables reconstruction of data block $D_{0,5}$ on data disk D1 in accordance with the row parity information stored in parity block $P_{0,8}$ of parity disk RP.

Upon reconstructing data block $D_{0,5}$, diagonal 5 is only missing one member and that member (i.e., data block $D_{1,5}$ on D0) can be reconstructed using diagonal parity. Reconstruction of data block $D_{1,5}$ allows reconstruction of data block $D_{1,6}$ on D1 in accordance with row parity recovery using parity block $P_{1,4}$ on parity disk RP. Note that this "diagonal-row" sequence of reconstruction proceeds until the last data block ($D_{3,8}$ on D1) used in computation of the missing diagonal parity set is reached. Here, the missing diagonal parity set ($P_8$) ends the chain of reconstruction. Note also that for each diagonal, the distance (i.e., the number of disks) between the failed disks is equal to the number of rows traversed when reconstructing the lost data along the diagonal parity set. It should be further noted that there is only one chain of reconstruction, but only one block of parity set 8 is missing.

As another example, assume adjacent disks D1 and D2 are lost, thereby resulting in each diagonal parity set 4 and 5 losing one member. The lost data block contributing to the diagonal parity set 5 ($D_{0,5}$ on D1) can be immediately reconstructed, as can the lost data block contributing to diagonal parity set 4 ($D_{3,4}$ on D2). Each of these reconstructed data blocks can be used to reconstruct another data block using row parity information in accordance with the "diagonal-row" pattern described above. Note that this is an example of two, parallel reconstruction "threads" used for reconstruction of the lost data disks. The first thread proceeds to reconstruct $D_{0,5}$, $D_{0,6}$, $D_{1,6}$, $D_{1,7}$, $D_{2,7}$, $D_{2,8}$ and the second thread proceeds to reconstruct $D_{3,4}$ and $D_{3,8}$. Again, each thread terminates at the missing diagonal parity set.

Assume now that two data disks are lost but that the data disks are not adjacent. For example, assume D0 and D2 are lost, resulting in diagonal parity sets 8 and 5 missing only one member. As noted, diagonal parity set 8 does not help in the reconstruction process, so the reconstruction chain begins with a missing data block contributing to diagonal parity set 5 ($D_{1,5}$ on D0). Reconstruction of that data block enables reconstruction of data block $D_{1,7}$ on D2 utilizing row parity information stored in parity block $P_{1,4}$ on parity disk RP. Since the lost data disks are two apart, reconstruction of the lost data block contributing to the diagonal parity set 7 requires traversing two rows of the array to, i.e., $D_{3,7}$ on D0. This in turn allows reconstruction of the lost data block $D_{3,4}$ on D2 using row parity. This "diagonal-row" pattern continues in accordance with modulo p ("wrap around") arithmetic, so that the next block reconstructed is $D_{0,4}$, then $D_{0,6}$, $D_{2,6}$ and finally $D_{2,8}$.

In summary, the sequence of reconstruction can be described by listing, in order, the diagonals that can be reconstructed, starting from the first diagonal reconstructed and ending with the missing diagonal parity. For two failing disks j and j+k, separated by k, one sequence of diagonals that can be reconstructed increments by k each time and the other decrements by k each time. This is because a row reconstruction moves k disks to the right (or left), and hence also moves to the next k higher (or lower) diagonal, modulo p. In most cases, there are at least two parallel reconstruction threads. The exceptions are if D0, which is the disk that does not include a block of the "missing" diagonal, and any other disk other than the diagonal parity disk DP are lost. In that case, there is only a single stream of reconstructed blocks, ending with the block in the missing diagonal parity set on the other missing disk.

Lost Writes Detection

Figure 6:
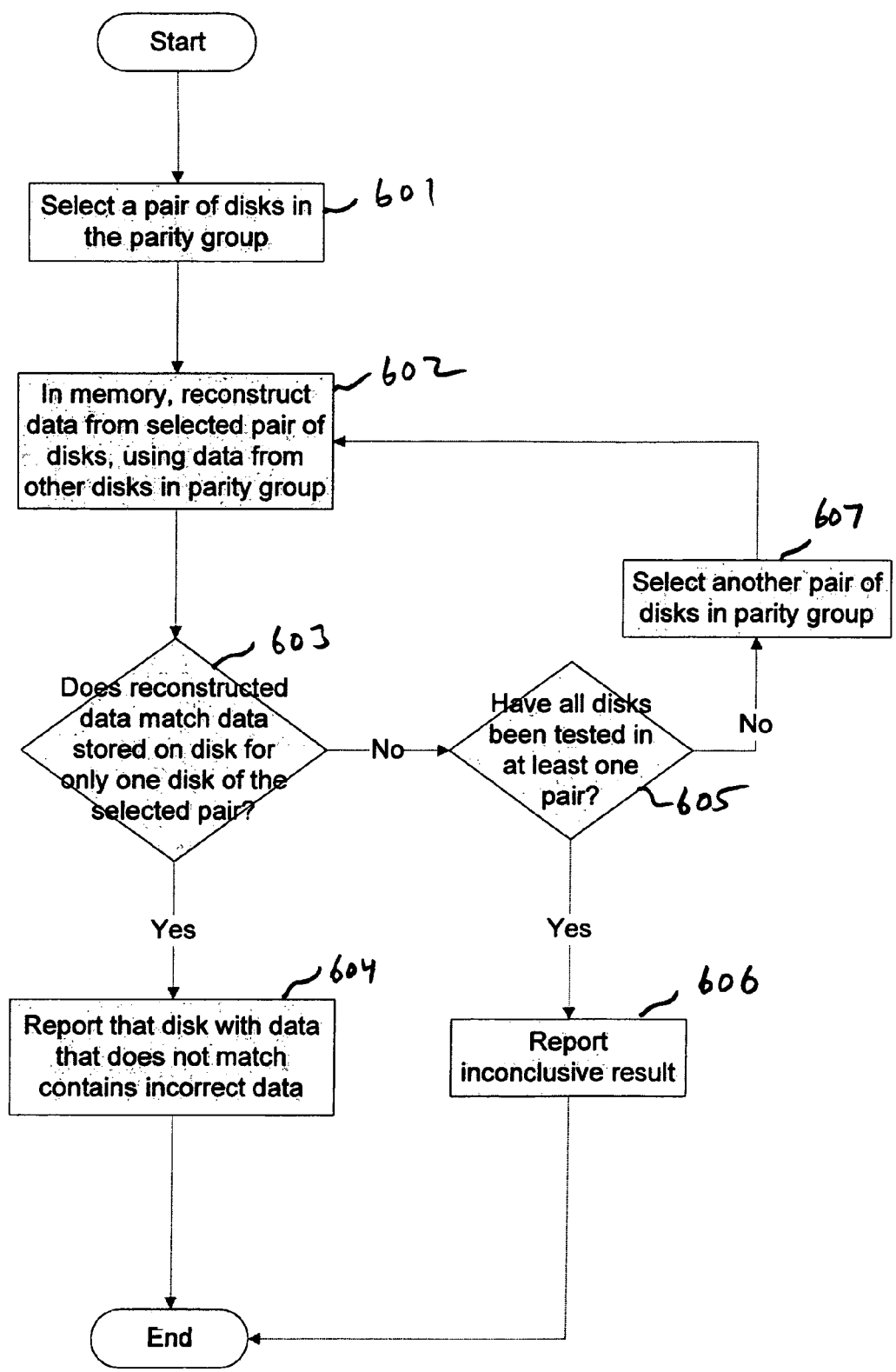
FIG. 6 is a flow diagram showing a process of identifying a disk which contains one or more lost writes.

Having thus described the RAID-DP technique, the lost write detection technique being introduced here will now be described further with reference to FIGS. 6 and 7A through 7H. FIG. 6 shows the basic process of identifying a disk that contains erroneous data, i.e., a disk containing one or more lost writes, i.e., one or more stale data blocks. Note that this process not only identifies a disk that contains erroneous data, but also inherently yields the identities of the particular block(s) which is/are bad (stale). This process can be performed in response to the parity scrub process detecting a mismatch between stored and recalculated parity.

Note that there are three types of parity inconsistency that can occur in a RAID-DP volume:
1. Both diagonal and row parity are inconsistent
2. Only row parity is inconsistent
3. Only diagonal parity is inconsistent It is contemplated that the lost write detection process of FIG. 6 will be applied to parity inconsistencies of the first type (both diagonal parity and row parity inconsistency), but not the second or third type. An inconsistency in row parity only is caused if a write to the row parity disk is dropped. Parity scrub can fix this occurrence simply by rewriting only the row parity block with the new computed value. Similarly, an inconsistency in diagonal parity only is caused if a write to the diagonal parity disk is dropped. Parity scrub can fix such an occurrence simply by rewriting only the diagonal parity block with the new computed value.

However, an inconsistency in both row and diagonal parity is caused by a lost write to a data block in the stripe. Accordingly, the process of FIG. 6 can be applied in such cases. The illustrative process of FIG. 6 is based on RAID-DP as the underlying redundancy scheme. The process is implemented by the lost writes detection module 36 in the RAID layer 34 of the operating system 24 (FIG. 2). The process is described for an illustrative embodiment in which the parity group (RAID group) has a total of six disks, i.e., four data disks, a row parity disk, and a diagonal parity disk At 601, a pair of disks in the parity group is selected, for testing. Since an inconsistency in both row and diagonal parity is caused by a lost write to a data block in the stripe, the initial pair of disks selected preferably includes only data disks, not parity disks, for optimal performance. If the parity scrub process encountered other errors on one disk in the group, such as checksum errors or media errors, then the process would begin with a pair that includes that disk. At 602, from each disk in the selected pair, the data block within the stripe which reported parity inconsistency is reconstructed in memory of the storage server, using the RAID-DP reconstruction process described above (FIG. 5). Then at 603 a determination is made of whether the reconstructed data block matches the corresponding data block actually stored on each disk in the selected pair. If the data blocks do not match for one of the disks, then that disk is the one which contains erroneous data (one or more lost writes). Accordingly, in that case that disk is reported as containing incorrect data (e.g., to a user or to a higher layer of software).

On the other hand, if the reconstructed data blocks fail to match the stored data blocks for both disks of the selected pair, then the process proceeds to 605, in which a determination is made of whether all disks in the parity group have been tested as above in at least one pair. If not, then at 607 a different pair of disks in the parity group is selected, and the process is repeated from 602 as described above, until the disk that contains erroneous data is identified (604) or until all of the disks in the parity group have been tested with no conclusive result (605). If all of the disks in the parity group are tested with no conclusive result, it may indicate that there is more than one disk that contains erroneous data.

The particular pair of disks selected during any particular iteration of 601 can be arbitrary, although as indicated above, the initial pair preferably includes data disks only, not parity. The exact same pair is not selected twice. Furthermore, a given disk can appear in more than one selected pair, assuming the disk that contains erroneous data is not identified on the first iteration. That is, different pairs can be overlapping or they can be mutually exclusive. However, selection of non-overlapping (mutually exclusive) pairs is preferable, to cover all disks in the fewest iterations (although with an odd number of disks, at least two pairs will overlap to cover all disks).

An example of how this process can be applied to detect lost writes will now be described with reference to FIGS. 7A through 7G. In each of FIGS. 7A through 7G, the bracket indicates a stripe which is one block wide (one block on each disk), where each block is composed of four sub-blocks of equal size. Thus, for purposes of computing parity, each row and each diagonal is one sub-block wide. Different shading patterns are used for the various sub-blocks in FIGS. 7A through 7G to identify the diagonals for which diagonal parity is computed; that is, sub-blocks with identical shading pattern all belong to the same diagonal. Note that the diagonals in FIGS. 7A through 7G slant in the opposite direction as the diagonals in the examples above, thus illustrating another way of implementing the RAID-DP technique. Also, to simplify description, simple addition is used in place of XOR (since these operations are mathematically equivalent), and small integers are used to represent the contents of the various sub-blocks.

Figure 7A:
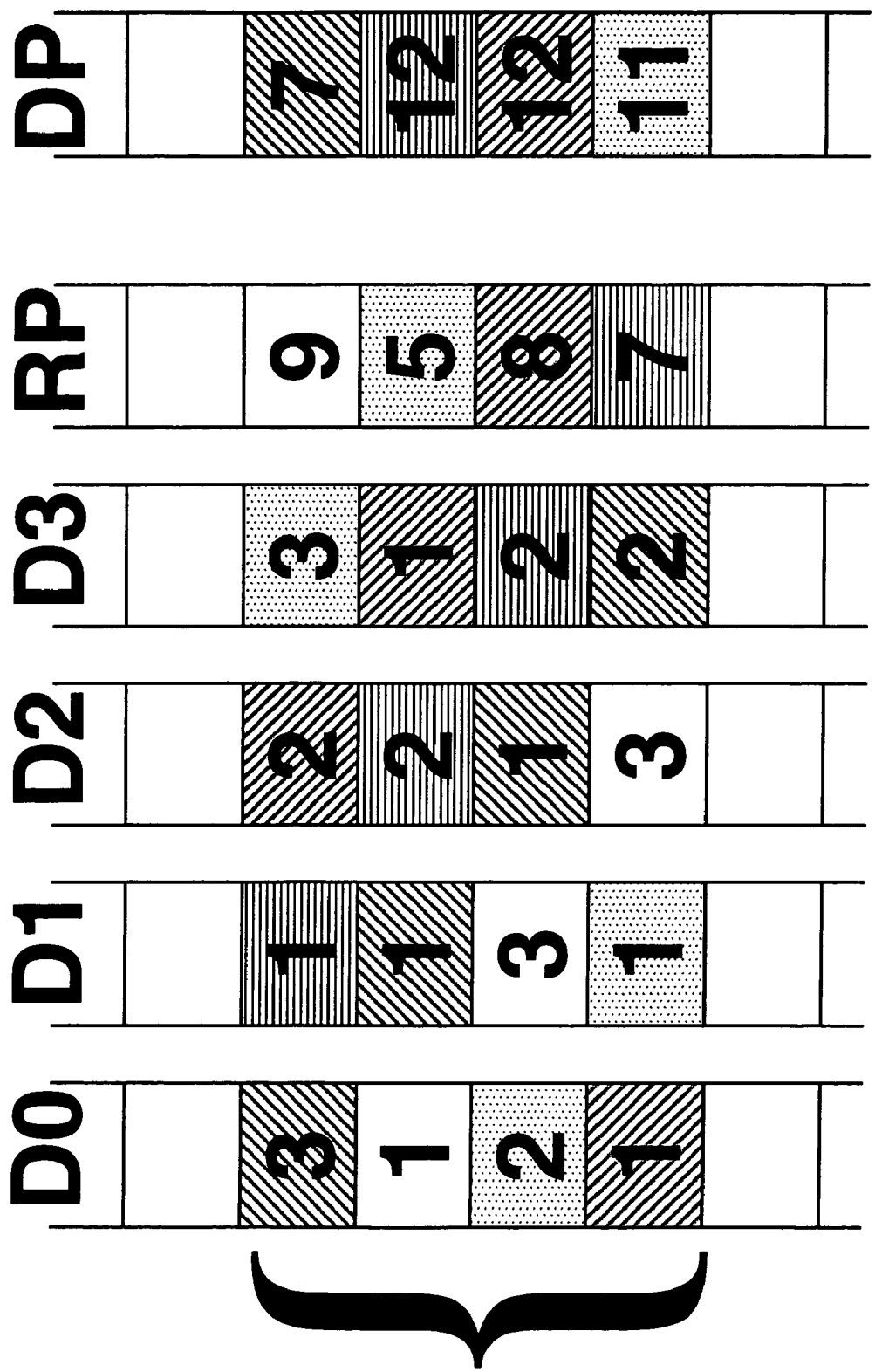
FIG. 7A through 7G show an example of the process of FIG. 6 being applied to a stripe.

FIG. 7A shows an example of the contents of a stripe where all of the data is correct. The parity for a row or diagonal is simply the sum of the values of the data disks (and in the case of a diagonal, the parity disk). So for example, it can be seen in FIG. 7A that the value 11 on the DP disk is correct as the sum of the diagonal containing the values 2, 1, 3, and 5.

Figure 7B:
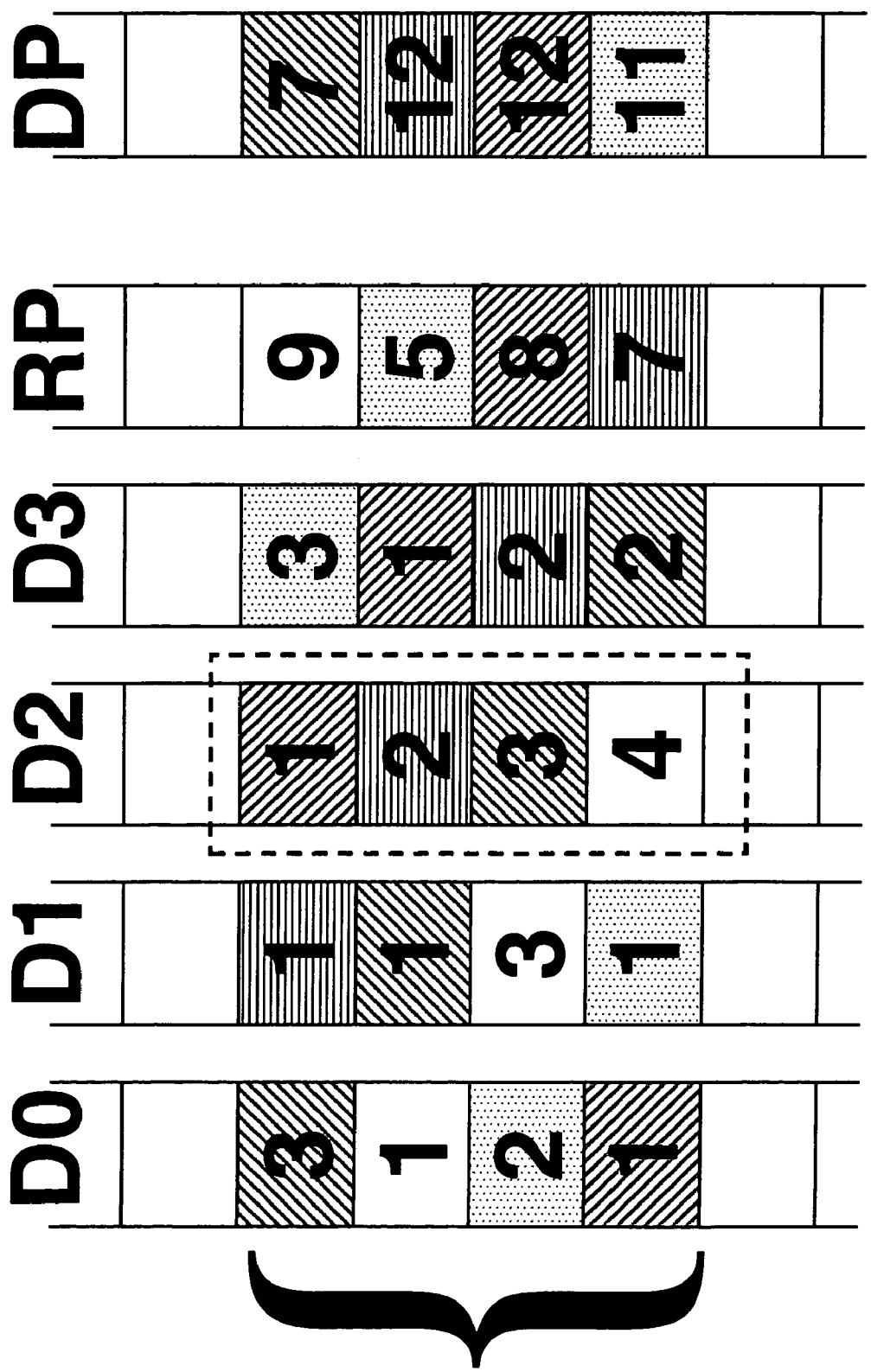
Figure 7C:
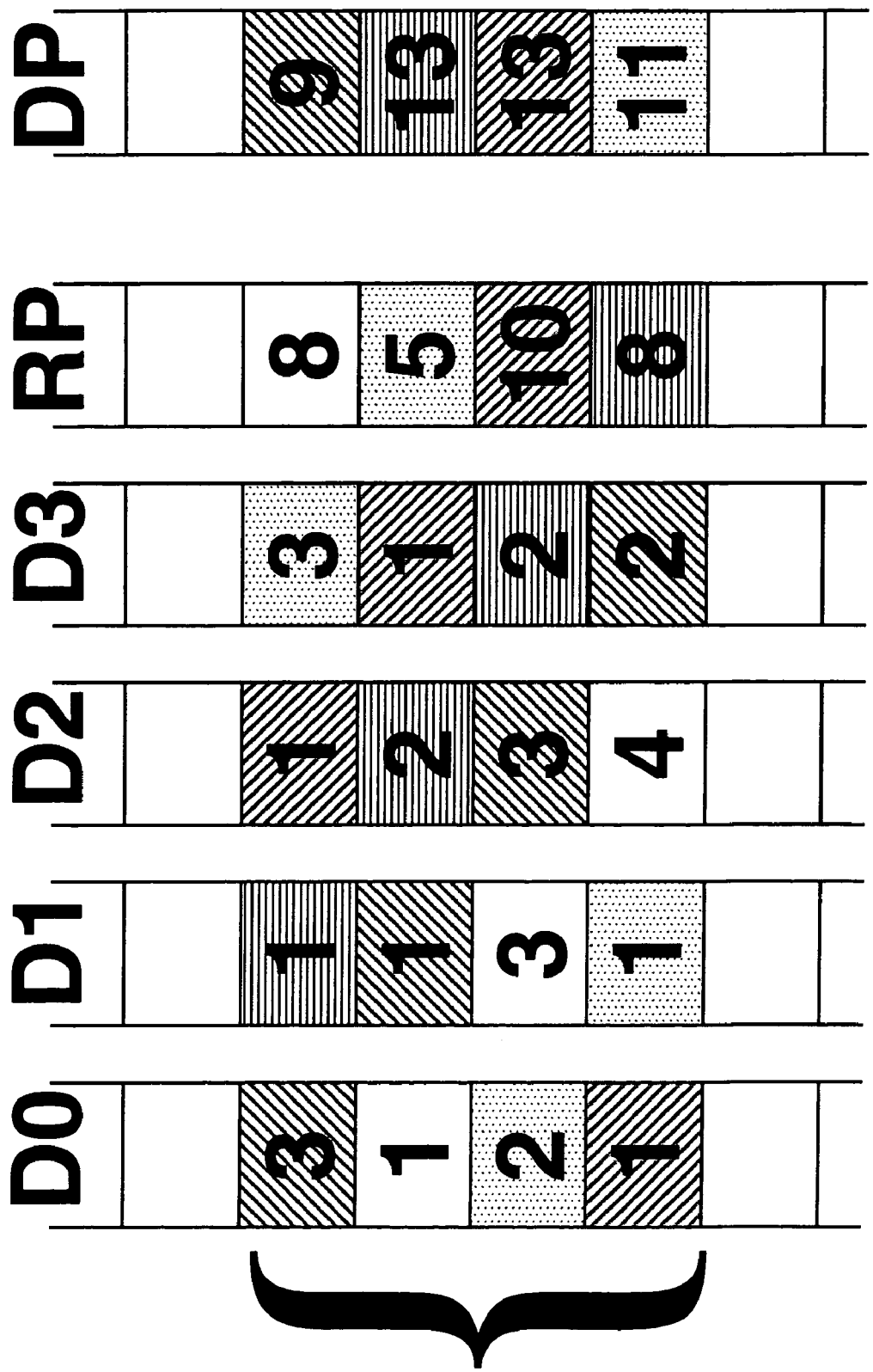

Now assume that a lost write was experienced on disk D2, and the contents there is not as it should be. Specifically, D2 holds the values (1,2,3,4), which should be (2,2,1,3) as in FIG. 7A. A RAID-DP scrub can detect this problem. FIG. 7C shows the recalculated parity. The recalculated parity does not match parity stored on disks, so there is a problem. For example, row parity (8, 5, 10, 8) does not match (9, 5, 8, 7) stored on disk RP, and diagonal parity (9, 13, 13, 11) does not match (7, 12, 12, 11) stored on disk DP.

Figure 7D:
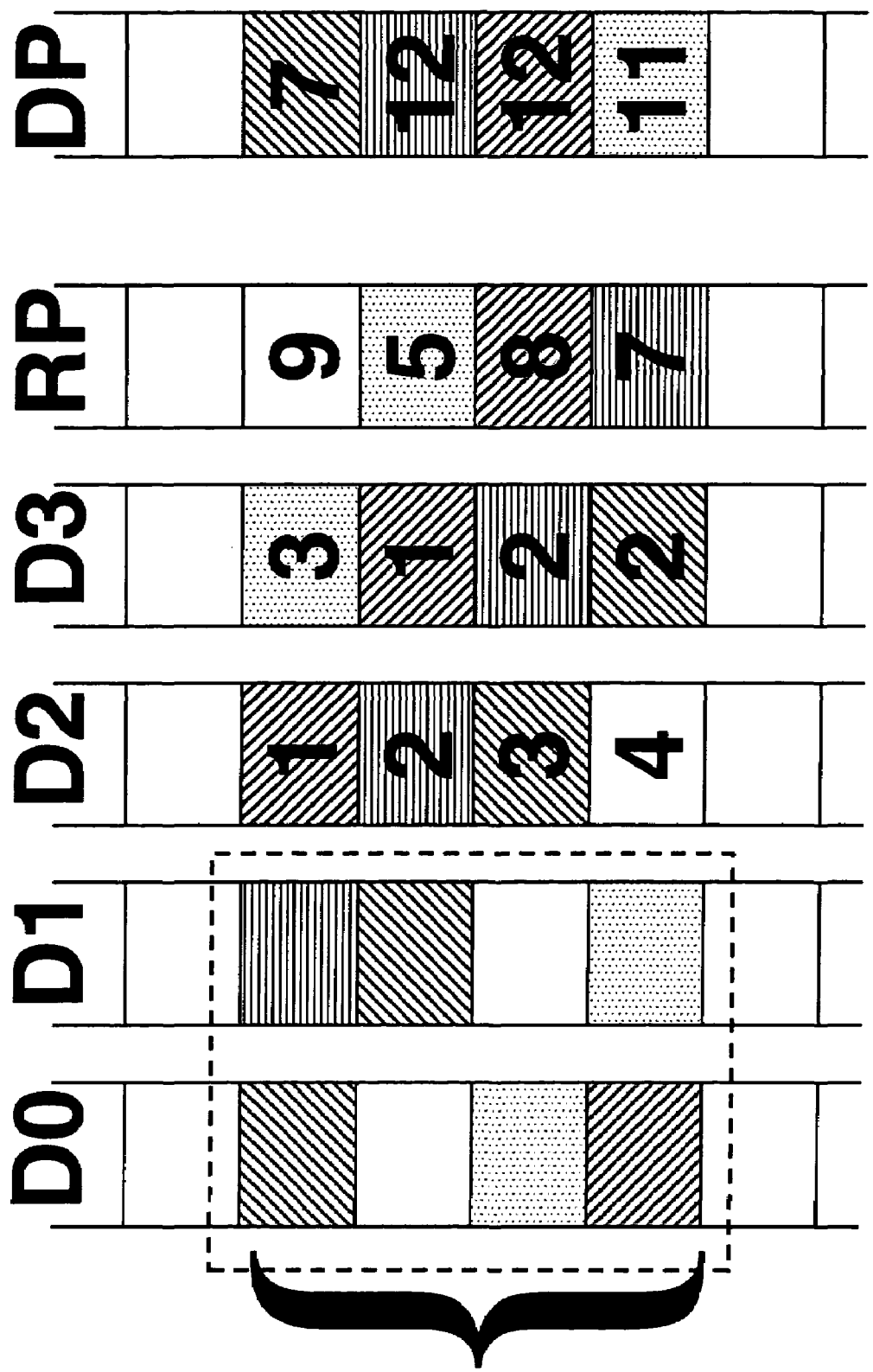
Figure 7E:
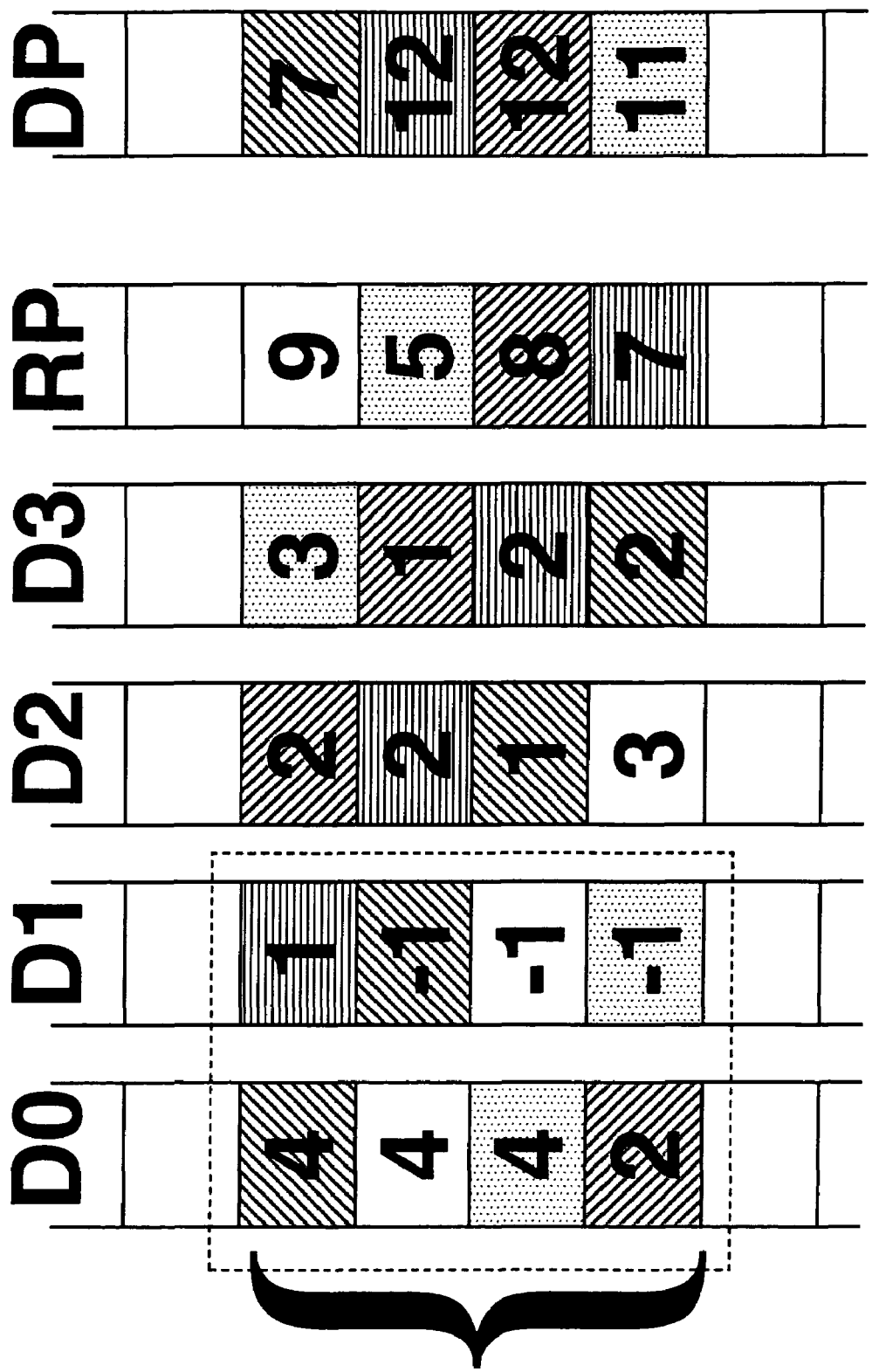

Referring to FIG. 7D, therefore, the lost write detection technique attempts to find the bad data (i.e., a lost write). Initially, a pair of disks are selected (per 601 in FIG. 6). As noted, which particular disks are selected can be arbitrary. In FIG. 7D, disks D0 and D1 have been selected first. Other data stored on disks are then used to perform RAID-DP reconstruction (as described above) in memory of the data on disks D0 and D1. The resulting reconstructed data in memory are shown in FIG. 7E.

It can be seen that the reconstructed data in memory (FIG. 7E) do not match the stored data (FIG. 7B) on either disk D0 or D1. Specifically, the reconstructed data for disk D0 (4, 4, 4, 2) do not match the stored data (3, 1, 2, 1), and the reconstructed data for disk D1 (1, −2, −1, −1) do not match the stored data (1, 1, 3, 1). Hence, the process determines that it is necessary to try another pair of disks.

Figure 7F:
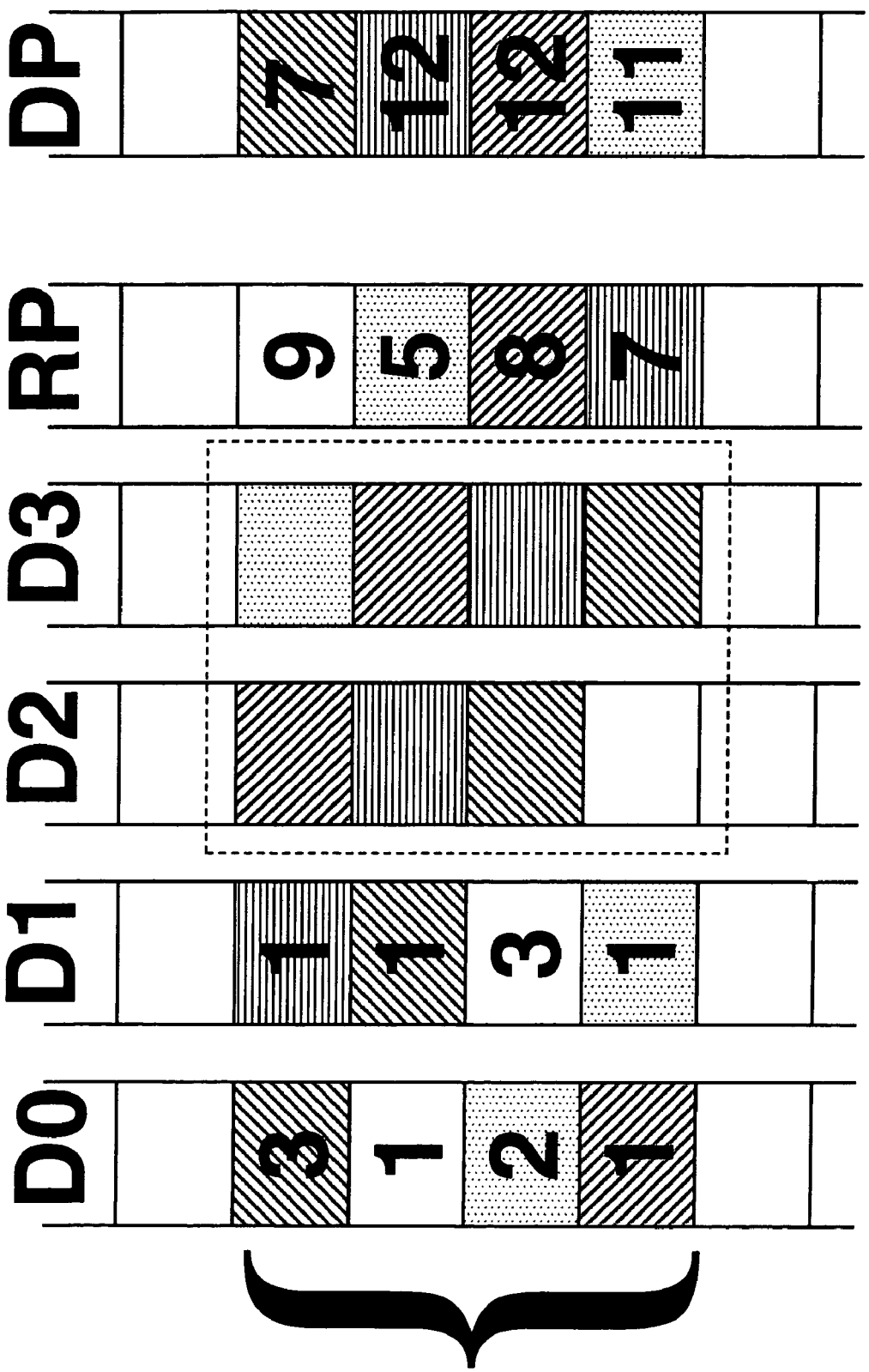
Figure 7G:
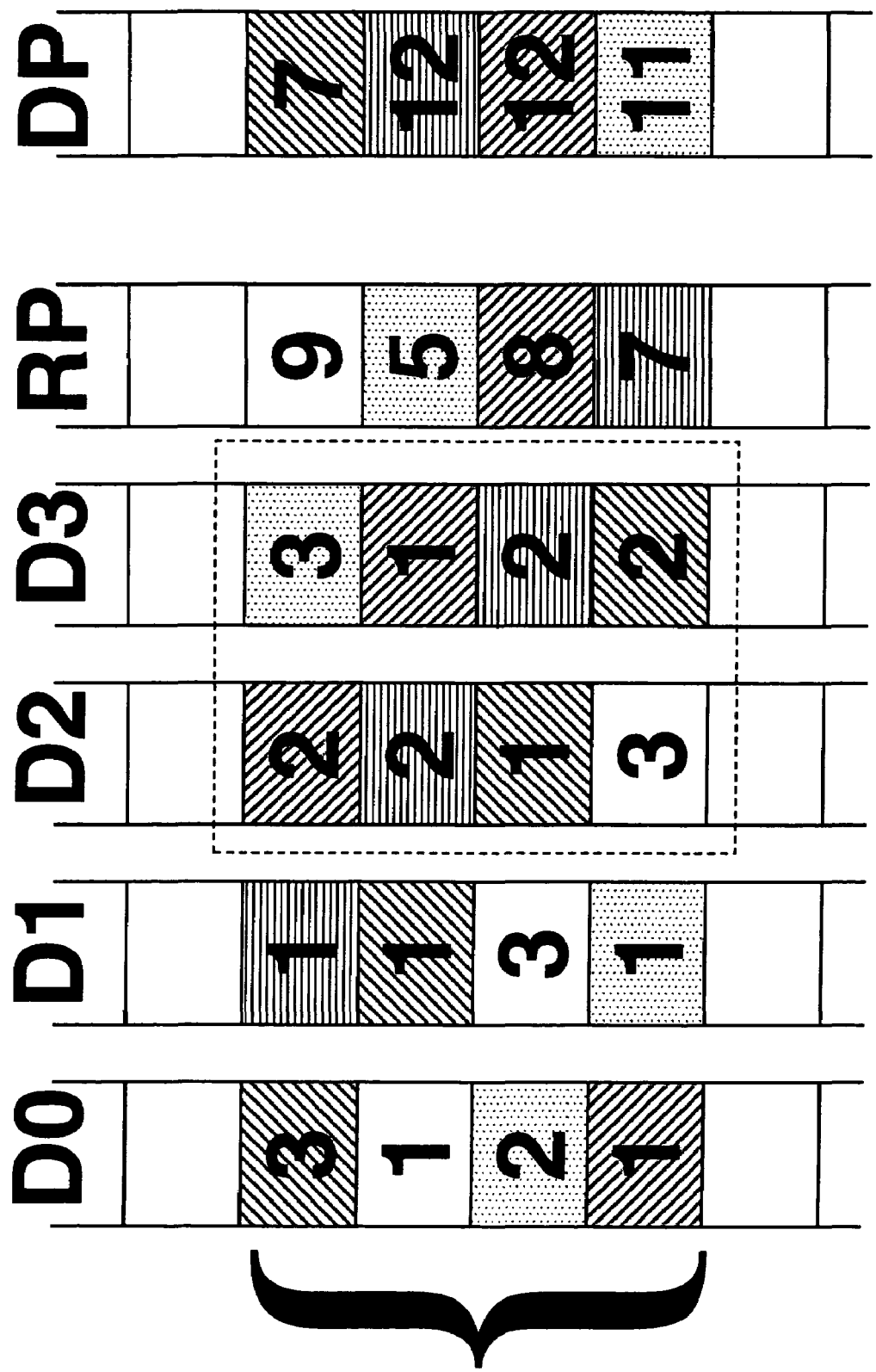

Therefore, disks D2 and D3 are next selected for reconstruction, as shown in FIG. 7F. Again, this choice is arbitrary; a different pair could just as well be selected. The reconstructed data in memory are shown in FIG. 7G. It can be seen that the reconstructed data of disk D3 match the stored data on that disk (FIG. 7B). However, the reconstructed data of disk D2 (2, 2, 1, 3) do not match the stored data (1, 2, 3, 4) on that disk. Therefore, the conclusion is that data on disk D2 are erroneous and should be replaced with (2, 2, 1, 3).

As already noted, the technique described above is not limited to implementations where the underlying redundancy scheme can reconstruct data on up to two disks (such as RAID-DP). Rather, the technique described above, with appropriate and relatively easy modification, can be extended to apply to implementations where the underlying redundancy schemes are even more powerful, i.e., can reconstruct all data in 3 or more mass storage devices that are missing or contain erroneous data.

For example, assume the underlying redundancy scheme allows reconstruction of all data in up to three mass storage devices that are missing or contain erroneous data. In that case, each selected subset in the process described above would include three disks (i.e., 601 in FIG. 6), and the process would look for the case where the reconstructed data match the stored data on only one of the three disks in the subset. In that case, the two disks for which the reconstructed data do not match the stored data would be considered to contain erroneous data. In a similar manner, the technique could be adapted to implementations where the underlying redundancy scheme can reconstruct the data in a larger number of mass storage devices.

Figure 8:
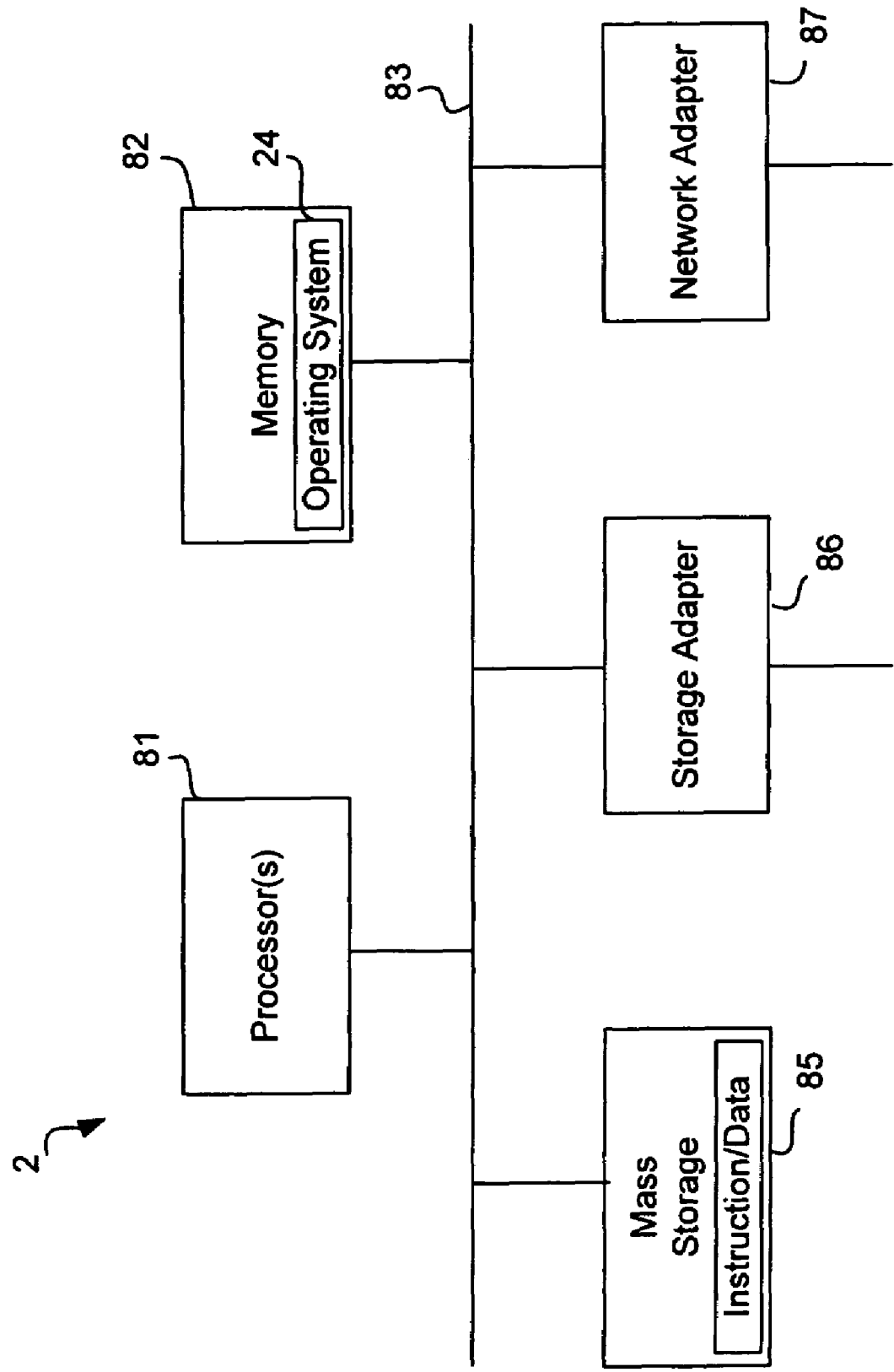
FIG. 8 is a high-level block diagram showing an example of the hardware architecture of the storage server.

FIG. 8 is a block diagram showing the architecture of the storage server 2, which may implement the above-described techniques, according to certain embodiments of the invention. Certain standard and well-known components which are not germane to the present invention may not be shown. The storage server 2 includes one or more processors 81 and memory 82 coupled to a bus system 83. The bus system 83 shown in FIG. 8 is an abstraction that represents any one or more separate physical buses and/or point-to-point connections, connected by appropriate bridges, adapters and/or controllers. The bus system 83, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 81 are the central processing units (CPUs) of the storage server 2 and, thus, control the overall operation of the storage server 2. In certain embodiments, the processors 81 accomplish this by executing software stored in memory 82. A processor 81 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 82 is or includes the main memory of the storage server 2. Memory 82 represents any form of random access memory (RAM), read-only memory (ROM), flash memory, or the like, or a combination of such devices. Memory 82 stores, among other things, the operating system 24 of the storage server 2, in which the lost write detection technique introduced above can be implemented.

Also connected to the processors 81 through the bus system 83 are one or more internal mass storage devices 85, a storage adapter 86 and a network adapter 87. Internal mass storage devices 85 may be or include any conventional medium for storing large volumes of data in a non-volatile manner, such as one or more magnetic or optical based disks. The storage adapter 86 allows the storage server 2 to access the storage subsystem 4 and may be, for example, a Fibre Channel adapter or a SCSI adapter. The network adapter 87 provides the storage server 2 with the ability to communicate with remote devices, such as the clients 1, over a network and may be, for example, an Ethernet adapter.

Thus, a method and apparatus for identifying erroneous data, such as may result from lost writes, based on a RAID-DP redundancy scheme have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

References throughout this specification to "one embodiment" or "an embodiment" mean that a particular feature, structure or characteristic described in connection with the embodiment is included in at least one embodiment of the present invention. Therefore, it is emphasized and should be appreciated that separate references in this specification to "an embodiment", "one embodiment" or "an alternative embodiment" are not necessarily all referring to the same embodiment. However, such references also are not necessarily mutually exclusive. Hence, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

storing data in a redundancy group of mass storage devices according to a data redundancy scheme, wherein the data redundancy scheme enables reconstruction of all data stored in X or fewer mass storage devices in the redundancy group which contain erroneous data, where X is at least 2; and in response to determining that the redundancy group contains erroneous data, specifically identifying X−1 mass storage devices in the redundancy group which contain the erroneous data by reconstructing data on a selected subset of the redundancy group, the selected subset including at least two but fewer than all of the mass storage devices in the redundancy group, comparing the reconstructed data to the stored data in the mass storage devices of the selected subset, if the reconstructed data does not match the stored data for only one of the mass storage devices in the subset, then determining that said one mass storage device contains the erroneous data, and if the reconstructed data does not match the stored data for all of the mass storage devices in the subset, then repeating said reconstructing and said comparing with a different selected subset of the redundancy group.

2. A method as recited in claim 1, wherein the redundancy group includes a plurality of data mass storage devices to store data, a first parity mass storage device to store parity information of a first type according to the data redundancy scheme, and a second parity mass storage device to store parity information of a second type according to the data redundancy scheme.

3. A method of specifically identifying at least one mass storage device in a redundancy group of mass storage devices as containing erroneous data, the method comprising:

reconstructing data on a selected subset of the redundancy group, the selected subset including at least two, but fewer than all, of the mass storage devices in the redundancy group;

comparing the reconstructed data to corresponding stored data in the mass storage devices of the selected subset; and if the reconstructed data does not match the corresponding stored data for only one of the mass storage devices of the subset, then identifying each mass storage device of said at least one but fewer than all of the mass storage devices of the subset as containing the erroneous data; and if the reconstructed data does not match the stored data for all of the mass storage devices in the subset, then repeating said reconstructing and said comparing with a different selected subset of the redundancy group.

4. A method as recited in claim 3, wherein said reconstructing data comprises using parity information to reconstruct the data on each mass storage device of the subset.

5. A method as recited in claim 3, wherein the redundancy group includes a plurality of data storage devices to store data, a row parity storage device to store row parity information, and a diagonal parity storage device to store diagonal parity information;

and wherein the redundancy scheme includes:

computing the diagonal parity information along diagonal parity sets, each of the diagonal parity sets including at least two of the data storage devices and the row parity storage device; and storing, on the diagonal parity storage device, the diagonal parity information for all but one of the diagonal parity sets.

6. A method comprising:

storing data in a parity group that includes a plurality of disks by using a redundancy scheme that includes row parity and diagonal parity, the parity group including a plurality of data disks to store data, a row parity disk to store row parity information, and a diagonal parity disk to store diagonal parity information, each of the plurality of disks including a plurality of data blocks, wherein the row parity information corresponds to parity rows that include data from each of the plurality of data disks;

using an error detection process to detect, based on the redundancy scheme, that at least one disk in the parity group contains erroneous data;

in response to detecting that at least one disk in the parity group contains erroneous data, executing an error location process that includes selecting a subset of the parity group, the subset containing at least two but less than all of the plurality of disks, and performing a subprocess that includes
reconstructing data on each disk of the subset,
determining whether the reconstructed data for each disk in the subset match the stored data on each disk of the subset,
if the reconstructed data does not match the stored data for only one of the disks in the subset, then determining that said one disk contains the erroneous data, and
if the reconstructed data does not match the stored data for all the disks in the subset, then repeating said subprocess with a different selected subset of the parity group.

7. A method as recited in claim 6, wherein said determining that said one disk contains the erroneous data comprises specifically identifying the erroneous data block on said one disk.

8. A method as recited in claim 6, wherein said redundancy scheme comprises:
computing the diagonal parity information along diagonal parity sets, each of the diagonal parity sets including at least two of the data disks and the row parity disk; and
storing, on the diagonal parity disk, the diagonal parity information for all but one of the diagonal parity sets.

9. A method as recited in claim 6, wherein said redundancy scheme comprises:
computing the diagonal parity information along diagonal parity sets, each of the diagonal parity sets including at least two of the data disks and the row parity disk; and
storing, on the diagonal parity disk, the diagonal parity information for all but one of the diagonal parity sets;
and wherein the error location process further comprises:
if the reconstructed data mismatches the stored data for all disks of the subset, then repeating said subprocess with a different selected subset of the parity group.

10. A processing system comprising:
a client interface through which to receive a data access request from a client;
a storage interface through which to access a redundancy group of mass storage devices in response to the data access request;
a file system to issue a write, the write for causing data to be written to the redundancy group; and
a storage layer to apply a data redundancy scheme to data stored in the redundancy group, and to specifically identify a mass storage device in the redundancy group which contains the erroneous data, by:
reconstructing data on a selected subset of the redundancy group, the selected subset including at least two but fewer than all of the mass storage devices in the redundancy group,
comparing the reconstructed data to the stored data in the mass storage devices of the selected subset,
if the reconstructed data does not match the stored data for only one of the mass storage device in the subset, then determining that said one mass storage device contains the erroneous data, and
if the reconstructed data mismatches the stored data for all of the mass storage devices in the subset, then repeating said reconstructing and said comparing with a different selected subset of the redundancy group.

11. A processing system as recited in claim 10, wherein the storage layer is a RAID layer to apply a RAID scheme to the redundancy group.

12. A processing system as recited in claim 11, wherein the redundancy group includes a plurality of data storage devices to store data, a row parity storage device to store row parity information, and a diagonal parity storage device to store diagonal parity information;
and wherein the RAID scheme includes:
computing the diagonal parity information along diagonal parity sets, each of the diagonal parity sets including at least two of the data storage devices and the row parity storage device; and
storing, on the diagonal parity storage device, the diagonal parity information for all but one of the diagonal parity sets.

13. A storage server comprising:
a processor unit;
a client interface, coupled to the processor unit, through which to communicate with a client;
a storage interface, coupled to the processor unit, through which to access a parity group of storage devices in response to a data access request from the client, the parity group including a plurality of data disks to store data, a row parity disk to store row parity information, and a diagonal parity disk to store diagonal parity information, wherein the row parity information corresponds to parity rows that include data from each of the plurality of data disks; and
a memory storing software which, when executed by the processor unit, causes the storage server to execute a process that includes:
storing data in the parity group by applying a redundancy scheme that generates the row parity information and the diagonal parity information;
using an error detection process to detect, based on the redundancy scheme, that at least one disk in the parity group contains erroneous data; and
executing an error location process in response to detecting that at least one disk in the parity group contains erroneous data, the error location process including
reconstructing data on a selected subset of the parity group, the subset including at least two but fewer than all of the disks in the parity group,
comparing the reconstructed data to the stored data in the disks of the subset,
if the reconstructed data does not match the stored data for only one of the disks in the subset, then determining that said one disk contains the erroneous data, and
if the reconstructed data does not match the stored data for all of the disks in the subset, then repeating said reconstructing and said comparing with a different selected subset of the parity group.

14. A storage server as recited in claim 13, wherein said redundancy scheme comprises:
computing the diagonal parity information along diagonal parity sets, each of the diagonal parity sets including at least two of the data disks and the row parity disk; and
storing, on the diagonal parity disk, the diagonal parity information for all but one of the diagonal parity sets.

* * * * *